(12) United States Patent
Downing

(10) Patent No.: US 10,025,967 B2
(45) Date of Patent: Jul. 17, 2018

(54) OPTICAL DATA MANIPULATION FOR SKEW AND GROWTH COMPENSATION

(71) Applicant: Pearson Education, Inc., New York, NY (US)

(72) Inventor: Michael S. Downing, Marion, IA (US)

(73) Assignee: PEARSON EDUCATION, INC., New York, NY (US)

( * ) Notice: Subject to any disclaimer, the term of this patent is extended or adjusted under 35 U.S.C. 154(b) by 0 days.

(21) Appl. No.: 15/008,312

(22) Filed: Jan. 27, 2016

(65) Prior Publication Data

US 2017/0213063 A1   Jul. 27, 2017

(51) Int. Cl.
*G06K 7/10*   (2006.01)
*G06K 7/14*   (2006.01)

(52) U.S. Cl.
CPC .................. *G06K 7/1439* (2013.01)

(58) Field of Classification Search
CPC ..... G06K 7/14; G06K 7/1447; H04N 1/00968
See application file for complete search history.

(56) References Cited

U.S. PATENT DOCUMENTS

| | | | | |
|---|---|---|---|---|
| 4,686,704 A | * | 8/1987 | Kamada | H04N 1/00968 235/440 |
| 5,099,340 A | * | 3/1992 | Kamada | G06F 17/243 358/402 |
| 5,226,097 A | * | 7/1993 | Sakashita | G06K 7/14 358/463 |
| 5,720,013 A | * | 2/1998 | Uda | H04N 1/00204 358/1.15 |
| 6,357,658 B1 | * | 3/2002 | Garczynski | G06K 7/10574 235/454 |
| 6,741,738 B2 | | 5/2004 | Taylor | |
| 2004/0131279 A1 | * | 7/2004 | Poor | G06K 7/12 382/287 |
| 2006/0289651 A1 | | 12/2006 | Gostling | |
| 2008/0227075 A1 | * | 9/2008 | Poor | G09B 7/02 434/307 R |
| 2013/0015244 A1 | * | 1/2013 | Anselment | G06K 7/10712 235/440 |
| 2014/0270481 A1 | | 9/2014 | Kleinman | |

* cited by examiner

*Primary Examiner* — Laura Gudorf
(74) *Attorney, Agent, or Firm* — Kilpatrick Townsend & Stockton LLP

(57) ABSTRACT

Systems and methods for extracting information from a scanned item having a plurality of regularly spaced row marks along at least part of a length of the scanned item are disclosed herein. The system can include a line scan camera that can generate a line of pixels of a portion of the scanned item in an imaging area; a feed device coupled to the line scan camera; and a timing circuit. The feed device can move at least a portion of the scanned item through the imaging area, and the timing circuit can provide a plurality of capture signals to the line scan camera. The timing circuit can vary a time interval between capture signals based on a number of pixels between adjacent row marks along at least a portion of the length of the scanned item.

20 Claims, 11 Drawing Sheets

OPTICAL DATA MANIPULATION FOR SKEW AND GROWTH COMPENSATION

BACKGROUND

This application relates to the field of optical mark recognition.

Optical mark recognition (also called optical mark reading and OMR) is the process of capturing human-marked data from document forms such as surveys and tests. Many traditional OMR devices work with a dedicated scanner device that shines a beam of light onto the form paper. The contrasting reflectivity at predetermined positions on a page is then used to detect these marked areas because they reflect less light than the blank areas of the paper.

Many OMR devices use a digital camera. A digital camera is a camera that encodes images and videos digitally and stores them for later reproduction. Specifically, many OMR devices use line-scan cameras, which are a subset of digital cameras. A line-scan camera traditionally has a single row of pixel sensors, instead of a matrix of them. The lines are continuously fed to a computer that joins them to each other and makes an image. This is most commonly done by connecting the camera output to a frame grabber which resides in an expansion slot of an industrial computer. The frame grabber acts to buffer the image and sometimes provide some processing before delivering to the computer software for processing.

While line-scan cameras are functional in OMR devices, there are problems arising from the use of OMR devices. Accordingly, further developments to OMR device and/or to line-scan cameras, or the control thereof, are desired.

BRIEF SUMMARY

One aspect of the present disclosure relates to a system for extracting information from a scanned item. This scanned item can include a plurality of regularly spaced row marks along at least part of a length of the scanned item. The system includes: a line scan camera that can generate a line of pixels of a portion of the scanned item in an imaging area; a feed device coupled to the line scan camera and that can move at least a portion of the scanned item through the imaging area; and a timing circuit coupled to the line scan camera. In some embodiments, the timing circuit can provide a plurality of capture signals to the line scan camera. In some embodiments, the timing circuit can vary a time interval between capture signals based on a number of pixels between adjacent row marks along at least a portion of the length of the scanned item.

In some embodiments, the timing circuit can: receive successive lines of pixels from the line scan camera in response to the providing of the plurality of capture signals; and identify row marks from the successive lines of pixels. In some embodiments, each of the lines of pixels is generated from a different portion of the object in the imaging. In some embodiments, the timing circuit can determine the number of pixels between row marks. In some embodiments, the row marks are adjacent along the length of the scanned item. In some embodiments, determining the number of pixels between row marks includes: identifying a first row mark; starting a counter that tracks the number of pixels between adjacent row marks; identifying a second row mark; and stopping the counter.

In some embodiments, the counter is incremented when a line of pixels is received that does not include the second row mark. In some embodiments, the timing circuit can generate a delta value, which delta value is the difference between ideal spacing data and a count value identifying the number of pixels between adjacent row marks. In some embodiments, the ideal spacing data is specific to the scanned item.

In some embodiments, the timing circuit can: compare the delta value to an update threshold; adjust a variable component when the delta value exceeds the update threshold; and generate a divisor based on the variable component. In some embodiments, the timing circuit can: receive a clock signal from a clock; generate a line rate from the clock signal and the divisor; and send a capture signal based on the line rate. In some embodiments, the line rate decreases when the number of pixels between adjacent row marks is too large. In some embodiments, the line rate increases when the number of pixels between adjacent row marks is too small.

One aspect of the present disclosure relates to a method for extracting information from a scanned item. The scanned item can include a plurality of regularly spaced row marks along at least part of a length of the scanned item. The method includes: sequentially generating a plurality of capture signal with a timing circuit; sequentially sending the plurality of capture signals to a line scan camera; receiving from the line scan camera a plurality of lines of pixels of portions of the scanned item moving through an imaging area in response to the sending of the plurality of capture signals; determining a number of pixels between adjacent row marks along at least a portion of the length of the scanned item; and varying the frequency of the sending of capture signals based on the number of pixels between adjacent row marks along at least a portion of the length of the scanned item.

In some embodiments, the method includes identifying row marks in the received plurality of lines of pixels. In some embodiments, the method includes determining the number of pixels between row marks, which row marks are adjacent along the length of the scanned item. In some embodiments, determining the number of pixels between row marks includes: identifying a first row mark; starting a counter that tracks the number of pixels between adjacent row marks; identifying a second row mark; and stopping the counter.

In some embodiments, the method includes incrementing the counter when a line of pixels is received that does not include the second row mark. In some embodiments, the method includes generating a delta value that is the difference between ideal spacing data and a count value identifying the number of pixels between adjacent row marks. In some embodiments, the method includes: comparing the delta value to an update threshold; adjusting a variable component when the delta value exceeds the update threshold; and generating a divisor based on the variable component.

In some embodiments, the method includes: receiving a clock signal from a clock; generating a line rate from the clock signal and the divisor; and sending a capture signal based on the line rate. In some embodiments, the line rate decreases when the number of pixels between adjacent row marks is too large, and in some embodiments the line rate increases when the number of pixels between adjacent row marks is too small.

One aspect of the present disclosure relates to a system for compensating for growth in a scanned item including a plurality of row marks including a first group of row marks and a second group of row marks. In some embodiments, the row marks are regularly spaced along at least part of a length of the scanned item. The system includes: a line scan camera that can generate a line of pixels of a portion of the scanned item in an imaging area; a control unit communicatingly coupled to the line scan camera; and a feed device coupled to the line scan camera. In some embodiments, the feed device can move at least a portion of the scanned item through the imaging area. In some embodiments, the control unit can: identify one of a first group of row marks, which first group of row marks is located along a first side of the scanned item; identify one of a second group of row marks, which second group of row marks is located along a second side of the scanned item; and generate corrected response area positions based on the identified one of the first group of row marks and the identified one of the second group of row marks.

In some embodiments, the control unit can determine the distance between the identified one of the first group of row marks and the identified one of the second group of row marks. In some embodiments, the distance between the identified one of the first group of row marks and the identified one of the second group of row marks can be the number of pixels between the identified one of the first group of row marks and the identified one of the second group of row marks.

In some embodiments, the control unit can: retrieve a standard count value, which standard count value defines an expected distance between the identified one of the first group of row marks and the identified one of the second group of row marks; and compare the number of pixels between the identified one of the first group of row marks and the identified one of the second group of row marks to the standard count value. In some embodiments, the control unit can generate an error value based on the comparison of the number of pixels between the identified one of the first group of row marks and the identified one of the second group of row marks to the standard count value.

In some embodiments, generating corrected response area positions includes: retrieving standard response area positions; and applying the error value to the standard response area positions. In some embodiments, the control unit can identify at least one response in at least one of the corrected response area positions. In some embodiments, the system includes a server communicatingly connected to the line scan camera. The server can: to receive lines of pixels from the line scan camera; and generate image data with the received lines of pixels. In some embodiments, the image data can be the combination of multiple lines of pixels into a single image.

In some embodiments, the system includes a scan database that can: receive the image data from the server; and store the received image data. In some embodiments, identifying one of the first group of row marks includes identifying a first contiguous group of pixels in at least two consecutive lines of pixels. In some embodiments, the first contiguous group of pixels: is located in a specified first portion of the pixels in each of the at least two consecutive lines of pixels; and includes a specified number of pixels in each of the at least two consecutive lines of pixels. In some embodiments, identifying one of the second group of row marks includes identifying a second contiguous group of pixels in at least two consecutive lines of pixels. In some embodiments, the second contiguous group of pixels: is located in a specified second portion of the pixels in each of the at least two consecutive lines of pixels; and includes a specified number of pixels in each of the at least two consecutive lines of pixels.

One aspect of the present disclosure relates to a method for compensating for growth in a scanned item. The scanned item includes a plurality of row marks including a first group of row marks and a second group of row marks. The row marks can be regularly spaced along at least part of a length of the scanned item. The method includes: moving at least a portion of the scanned item through an imaging area of a line scan camera with a feed device coupled to the line scan camera; repeatedly generating a set of line data of the portion of the scanned item in the imaging area with the line scan camera, which set of line data includes a line of pixels, and which portion of the scanned item from which the set of line data is generated changes with the movement of the portion of the scanned item through the imaging area; identifying one of a first group of row marks with a control unit, which first group of row marks is located along a first side of the scanned item; identifying one of a second group of row marks with the control unit, which second group of row marks is located along a second side of the scanned item; and generating corrected response area positions based on the identified one of the first group of row marks and the identified one of the second group of row marks.

In some embodiments, the method includes determining the distance between the identified one of the first group of row marks and the identified one of the second group of row marks with the control unit. In some embodiments, the distance between the identified one of the first group of row marks and the identified one of the second group of row marks can be the number of pixels between the identified one of the first group of row marks and the identified one of the second group of row marks.

In some embodiments, the method includes: retrieving a standard count value, which standard count value defines an expected distance between the identified one of the first group of row marks and the identified one of the second group of row marks; and comparing the number of pixels between the identified one of the first group of row marks and the identified one of the second group of row marks to the standard count value.

In some embodiments, the method includes generating an error value based on the comparison of the number of pixels between the identified one of the first group of row marks and the identified one of the second group of row marks to the standard count value. In some embodiments, generating corrected response area positions includes: retrieving standard response area positions; and applying the error value to the standard response area positions. In some embodiments, the method includes identifying at least one response in at least one of the corrected response area positions. In some embodiments, identifying one of the first group of row marks includes identifying a first contiguous group of pixels in at least two consecutive lines of pixels. In some embodiments, the first contiguous group of pixels: is located in a specified first portion of the pixels in each of the at least two consecutive lines of pixels; and includes a specified number of pixels in each of the at least two consecutive lines of pixels.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides illustrative embodiment(s) only and is not intended to limit the scope, applicability or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

Figure 1:
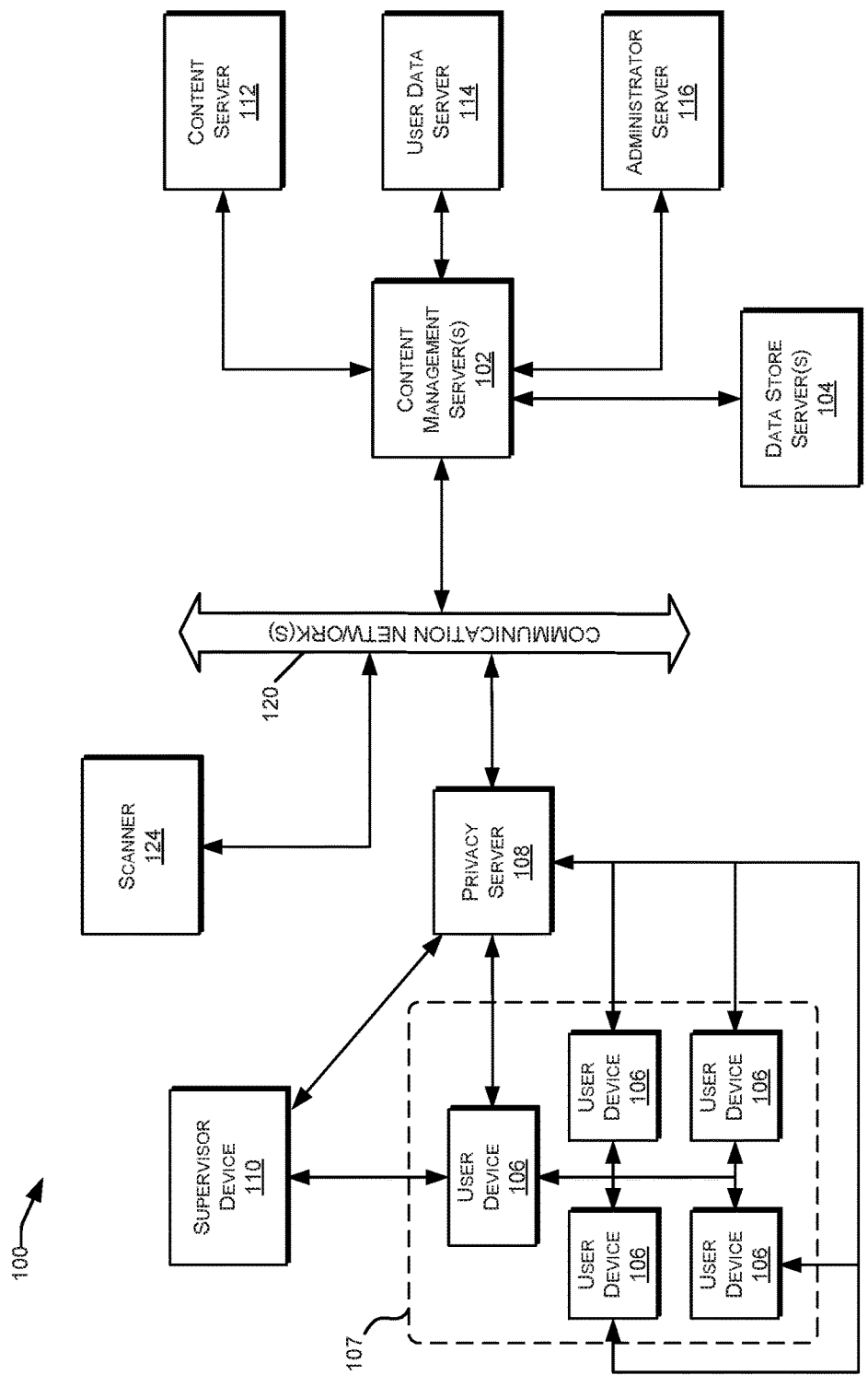
FIG. 1 is a block diagram showing illustrating an example of a content distribution network.

With reference now to FIG. 1, a block diagram is shown illustrating various components of a content distribution network (CDN) 100 which implements and supports certain embodiments and features described herein. Content distribution network 100 may include one or more content management servers 102. As discussed below in more detail, content management servers 102 may be any desired type of server including, for example, a rack server, a tower server, a miniature server, a blade server, a mini rack server, a mobile server, an ultra-dense server, a super server, or the like, and may include various hardware components, for example, a motherboard, a processing units, memory systems, hard drives, network interfaces, power supplies, etc. Content management server 102 may include one or more server farms, clusters, or any other appropriate arrangement and/or combination or computer servers. Content management server 102 may act according to stored instructions located in a memory subsystem of the server 102, and may run an operating system, including any commercially available server operating system and/or any other operating systems discussed herein.

The content distribution network 100 may include one or more data store servers 104, such as database servers and file-based storage systems. The database servers 104 can access data that can be stored on a variety of hardware components. These hardware components can include, for example, components forming tier 0 storage, components forming tier 1 storage, components forming tier 2 storage, and/or any other tier of storage. In some embodiments, tier 0 storage refers to storage that is the fastest tier of storage in the database server 104, and particularly, the tier 0 storage is the fastest storage that is not RAM or cache memory. In some embodiments, the tier 0 memory can be embodied in solid state memory such as, for example, a solid-state drive (SSD) and/or flash memory.

In some embodiments, the tier 1 storage refers to storage that is one or several higher performing systems in the memory management system, and that is relatively slower than tier 0 memory, and relatively faster than other tiers of memory. The tier 1 memory can be one or several hard disks that can be, for example, high-performance hard disks. These hard disks can be one or both of physically or communicatingly connected such as, for example, by one or several fiber channels. In some embodiments, the one or several disks can be arranged into a disk storage system, and specifically can be arranged into an enterprise class disk storage system. The disk storage system can include any desired level of redundancy to protect data stored therein, and in one embodiment, the disk storage system can be made with grid architecture that creates parallelism for uniform allocation of system resources and balanced data distribution.

In some embodiments, the tier 2 storage refers to storage that includes one or several relatively lower performing systems in the memory management system, as compared to the tier 1 and tier 2 storages. Thus, tier 2 memory is relatively slower than tier 1 and tier 0 memories. Tier 2 memory can include one or several SATA-drives or one or several NL-SATA drives.

In some embodiments, the one or several hardware and/or software components of the database server 104 can be arranged into one or several storage area networks (SAN), which one or several storage area networks can be one or several dedicated networks that provide access to data storage, and particularly that provides access to consolidated, block level data storage. A SAN typically has its own network of storage devices that are generally not accessible through the local area network (LAN) by other devices. The SAN allows access to these devices in a manner such that these devices appear to be locally attached to the user device.

Data stores 104 may comprise stored data relevant to the functions of the content distribution network 100. Illustrative examples of data stores 104 that may be maintained in certain embodiments of the content distribution network 100 are described below in reference to FIG. 3. In some embodiments, multiple data stores may reside on a single server 104, either using the same storage components of server 104 or using different physical storage components to assure data security and integrity between data stores. In other embodiments, each data store may have a separate dedicated data store server 104.

Content distribution network 100 also may include one or more user devices 106 and/or supervisor devices 110. User devices 106 and supervisor devices 110 may display content received via the content distribution network 100, and may support various types of user interactions with the content. User devices 106 and supervisor devices 110 may include mobile devices such as smartphones, tablet computers, personal digital assistants, and wearable computing devices. Such mobile devices may run a variety of mobile operating systems, and may be enabled for Internet, e-mail, short message service (SMS), Bluetooth®, mobile radio-frequency identification (M-RFID), and/or other communication protocols. Other user devices 106 and supervisor devices 110 may be general purpose personal computers or special-purpose computing devices including, by way of example, personal computers, laptop computers, workstation computers, projection devices, and interactive room display systems. Additionally, user devices 106 and supervisor devices 110 may be any other electronic devices, such as a thin-client computers, an Internet-enabled gaming systems, business or home appliances, and/or a personal messaging devices, capable of communicating over network(s) 120.

In different contexts of content distribution networks 100, user devices 106 and supervisor devices 110 may correspond to different types of specialized devices, for example, student devices and teacher devices in an educational network, employee devices and presentation devices in a company network, different gaming devices in a gaming network, etc. In some embodiments, user devices 106 and supervisor devices 110 may operate in the same physical location 107, such as a classroom or conference room. In such cases, the devices may contain components that support direct communications with other nearby devices, such as a wireless transceivers and wireless communications interfaces, Ethernet sockets or other Local Area Network (LAN) interfaces, etc. In other implementations, the user devices 106 and supervisor devices 110 need not be used at the same location 107, but may be used in remote geographic locations in which each user device 106 and supervisor device 110 may use security features and/or specialized hardware (e.g., hardware-accelerated SSL and HTTPS, WS-Security, firewalls, etc.) to communicate with the content management server 102 and/or other remotely located user devices 106. Additionally, different user devices 106 and supervisor devices 110 may be assigned different designated roles, such as presenter devices, teacher devices, administrator devices, or the like, and in such cases the different devices may be provided with additional hardware and/or software components to provide content and support user capabilities not available to the other devices.

The content distribution network 100 also may include a privacy server 108 that maintains private user information at the privacy server 108 while using applications or services hosted on other servers. For example, the privacy server 108 may be used to maintain private data of a user within one jurisdiction even though the user is accessing an application hosted on a server (e.g., the content management server 102) located outside the jurisdiction. In such cases, the privacy server 108 may intercept communications between a user device 106 or supervisor device 110 and other devices that include private user information. The privacy server 108 may create a token or identifier that does not disclose the private information and may use the token or identifier when communicating with the other servers and systems, instead of using the user's private information.

As illustrated in FIG. 1, the content management server 102 may be in communication with one or more additional servers, such as a content server 112, a user data server 112, and/or an administrator server 116. Each of these servers may include some or all of the same physical and logical components as the content management server(s) 102, and in some cases, the hardware and software components of these servers 112-116 may be incorporated into the content management server(s) 102, rather than being implemented as separate computer servers.

Content server 112 may include hardware and software components to generate, store, and maintain the content resources for distribution to user devices 106 and other devices in the network 100. For example, in content distribution networks 100 used for professional training and educational purposes, content server 112 may include data stores of training materials, presentations, plans, syllabi, reviews, evaluations, interactive programs and simulations, course models, course outlines, and various training interfaces that correspond to different materials and/or different types of user devices 106. In content distribution networks 100 used for media distribution, interactive gaming, and the like, a content server 112 may include media content files such as music, movies, television programming, games, and advertisements.

User data server 114 may include hardware and software components that store and process data for multiple users relating to each user's activities and usage of the content distribution network 100. For example, the content management server 102 may record and track each user's system usage, including their user device 106, content resources accessed, and interactions with other user devices 106. This data may be stored and processed by the user data server 114, to support user tracking and analysis features. For instance, in the professional training and educational contexts, the user data server 114 may store and analyze each user's training materials viewed, presentations attended, courses completed, interactions, evaluation results, and the like. The user data server 114 may also include a repository for user-generated material, such as evaluations and tests completed by users, and documents and assignments prepared by users. In the context of media distribution and interactive gaming, the user data server 114 may store and process resource access data for multiple users (e.g., content titles accessed, access times, data usage amounts, gaming histories, user devices and device types, etc.).

Administrator server 116 may include hardware and software components to initiate various administrative functions at the content management server 102 and other components within the content distribution network 100. For example, the administrator server 116 may monitor device status and performance for the various servers, data stores, and/or user devices 106 in the content distribution network 100. When necessary, the administrator server 116 may add or remove devices from the network 100, and perform device maintenance such as providing software updates to the devices in the network 100. Various administrative tools on the administrator server 116 may allow authorized users to set user access permissions to various content resources, monitor resource usage by users and devices 106, and perform analyses and generate reports on specific network users and/or devices (e.g., resource usage tracking reports, training evaluations, etc.).

The content distribution network 100 may include one or more communication networks 120. Although only a single network 120 is identified in FIG. 1, the content distribution network 100 may include any number of different communication networks between any of the computer servers and devices shown in FIG. 1 and/or other devices described herein. Communication networks 120 may enable communication between the various computing devices, servers, and other components of the content distribution network 100. As discussed below, various implementations of content distribution networks 100 may employ different types of networks 120, for example, computer networks, telecommunications networks, wireless networks, and/or any combination of these and/or other networks.

The content distribution network 100 can include a scanner 124. The scanner 124 can be any imaging system that can optically acquire one or several pieces of data. In some embodiments, these pieces of data can be in the form of one or several pixels captured by a camera that can be, for example, a digital camera. In some embodiments, the digital camera can output a single row of pixels (a line-scan camera), and in some embodiments, the digital camera can output an array of pixels (an area-scan camera). In some embodiments, the scanner 124 can be configured for use in optical character recognition (OCR) or optical mark recognition (OMR).

Figure 2:
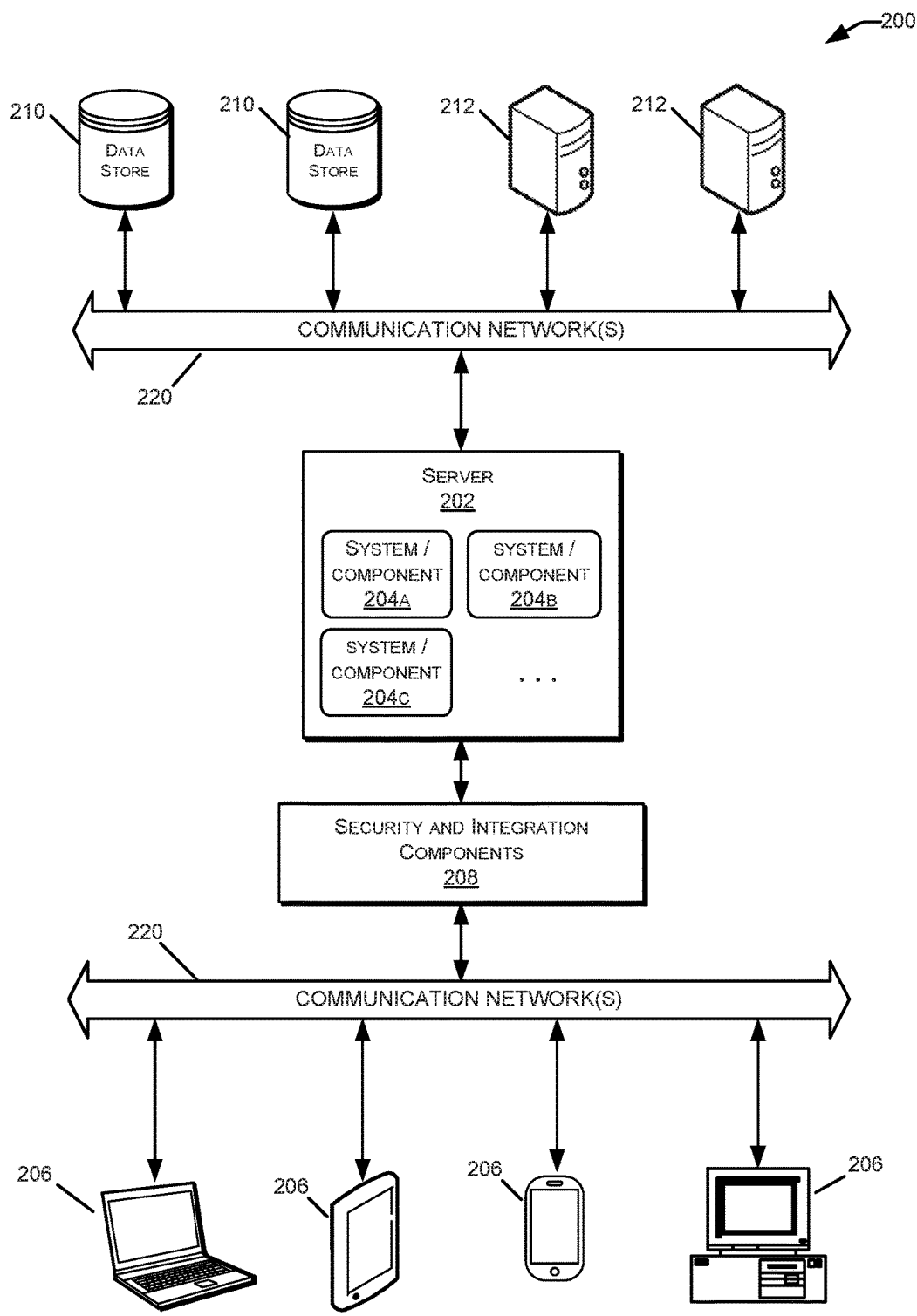
FIG. 2 is a block diagram illustrating a computer server and computing environment within a content distribution network.

With reference to FIG. 2, an illustrative distributed computing environment 200 is shown including a computer server 202, four client computing devices 206, and other components that may implement certain embodiments and features described herein. In some embodiments, the server 202 may correspond to the content management server 102 discussed above in FIG. 1, and the client computing devices 206 may correspond to the user devices 106. However, the computing environment 200 illustrated in FIG. 2 may correspond to any other combination of devices and servers configured to implement a client-server model or other distributed computing architecture.

Client devices 206 may be configured to receive and execute client applications over one or more networks 220. Such client applications may be web browser based applications and/or standalone software applications, such as mobile device applications. Server 202 may be communicatively coupled with the client devices 206 via one or more communication networks 220. Client devices 206 may receive client applications from server 202 or from other application providers (e.g., public or private application stores). Server 202 may be configured to run one or more server software applications or services, for example, web-based or cloud-based services, to support content distribution and interaction with client devices 206. Users operating client devices 206 may in turn utilize one or more client applications (e.g., virtual client applications) to interact with server 202 to utilize the services provided by these components.

Various different subsystems and/or components 204 may be implemented on server 202. Users operating the client devices 206 may initiate one or more client applications to use services provided by these subsystems and components. The subsystems and components within the server 202 and client devices 206 may be implemented in hardware, firmware, software, or combinations thereof. Various different system configurations are possible in different distributed computing systems 200 and content distribution networks 100. The embodiment shown in FIG. 2 is thus one example of a distributed computing system and is not intended to be limiting.

Although exemplary computing environment 200 is shown with four client computing devices 206, any number of client computing devices may be supported. Other devices, such as specialized sensor devices, etc., may interact with client devices 206 and/or server 202.

As shown in FIG. 2, various security and integration components 208 may be used to send and manage communications between the server 202 and user devices 206 over one or more communication networks 220. The security and integration components 208 may include separate servers, such as web servers and/or authentication servers, and/or specialized networking components, such as firewalls, routers, gateways, load balancers, and the like. In some cases, the security and integration components 208 may correspond to a set of dedicated hardware and/or software operating at the same physical location and under the control of same entities as server 202. For example, components 208 may include one or more dedicated web servers and network hardware in a datacenter or a cloud infrastructure. In other examples, the security and integration components 208 may correspond to separate hardware and software components which may be operated at a separate physical location and/or by a separate entity.

Security and integration components 208 may implement various security features for data transmission and storage, such as authenticating users and restricting access to unknown or unauthorized users. In various implementations, security and integration components 208 may provide, for example, a file-based integration scheme or a service-based integration scheme for transmitting data between the various devices in the content distribution network 100. Security and integration components 208 also may use secure data transmission protocols and/or encryption for data transfers, for example, File Transfer Protocol (FTP), Secure File Transfer Protocol (SFTP), and/or Pretty Good Privacy (PGP) encryption.

In some embodiments, one or more web services may be implemented within the security and integration components 208 and/or elsewhere within the content distribution network 100. Such web services, including cross-domain and/or cross-platform web services, may be developed for enterprise use in accordance with various web service standards, such as RESTful web services (i.e., services based on the Representation State Transfer (REST) architectural style and constraints), and/or web services designed in accordance with the Web Service Interoperability (WS-I) guidelines. Some web services may use the Secure Sockets Layer (SSL) or Transport Layer Security (TLS) protocol to provide secure connections between the server 202 and user devices 206. SSL or TLS may use HTTP or HTTPS to provide authentication and confidentiality. In other examples, web services may be implemented using REST over HTTPS with the OAuth open standard for authentication, or using the WS-Security standard which provides for secure SOAP messages using XML encryption. In other examples, the security and integration components 208 may include specialized hardware for providing secure web services. For example, security and integration components 208 may include secure network appliances having built-in features such as hardware-accelerated SSL and HTTPS, WS-Security, and firewalls. Such specialized hardware may be installed and configured in front of any web servers, so that any external devices may communicate directly with the specialized hardware.

Communication network(s) 220 may be any type of network familiar to those skilled in the art that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Bluetooth®, Near Field Communication (NFC), and the like. Merely by way of example, network(s) 220 may be local area networks (LAN), such as one based on Ethernet, Token-Ring and/or the like. Network(s) 220 also may be wide-area networks, such as the Internet. Networks 220 may include telecommunication networks such as a public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 220.

Computing environment 200 also may include one or more data stores 210 and/or back-end servers 212. In certain examples, the data stores 210 may correspond to data store server(s) 104 discussed above in FIG. 1, and back-end servers 212 may correspond to the various back-end servers 112-116. Data stores 210 and servers 212 may reside in the same datacenter or may operate at a remote location from server 202. In some cases, one or more data stores 210 may reside on a non-transitory storage medium within the server 202. Other data stores 210 and back-end servers 212 may be remote from server 202 and configured to communicate with server 202 via one or more networks 220. In certain embodiments, data stores 210 and back-end servers 212 may reside in a storage-area network (SAN), or may use storage-as-a-service (STaaS) architectural model.

Figure 3:
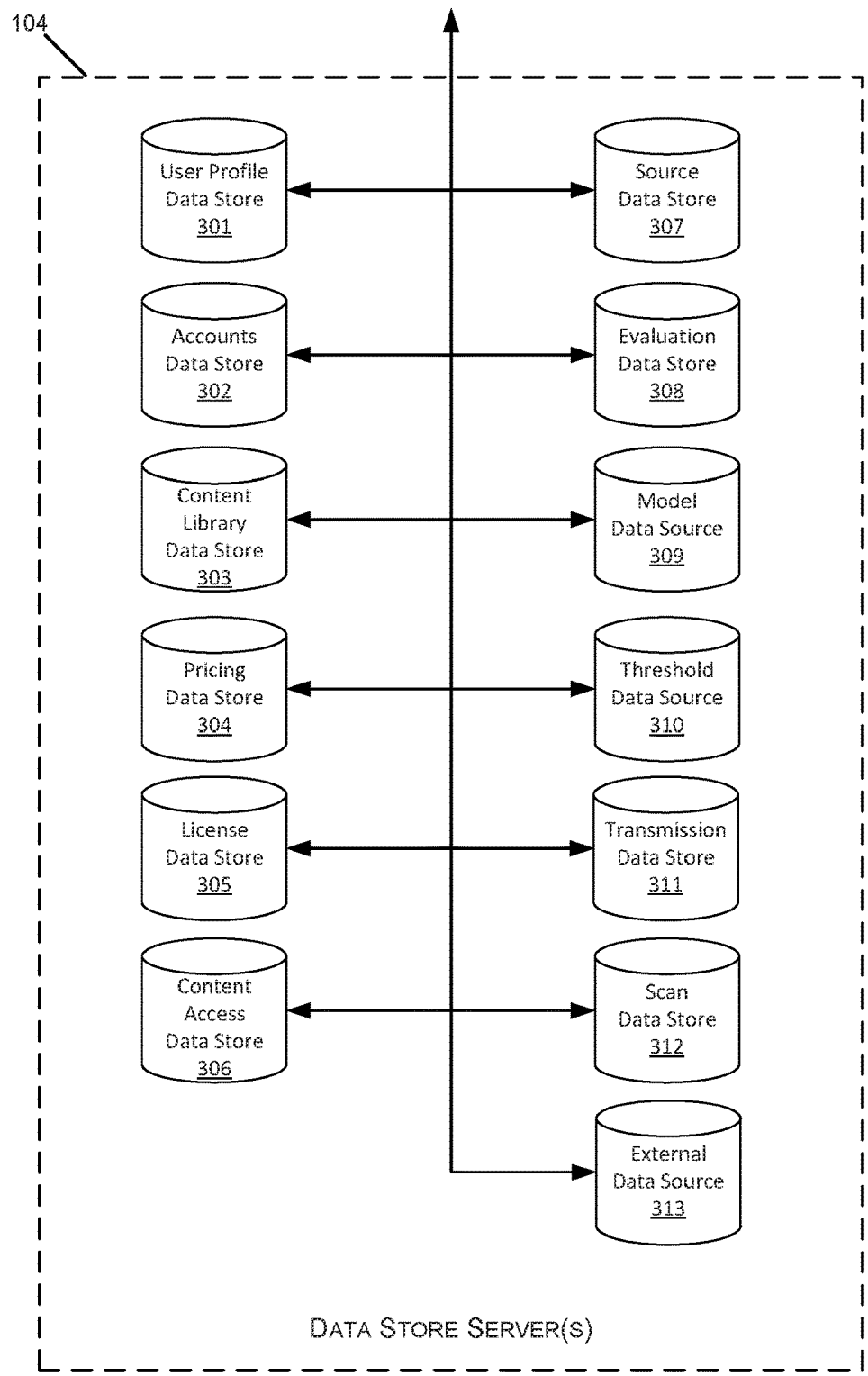
FIG. 3 is a block diagram illustrating an embodiment of one or more data store servers within a content distribution network.

With reference to FIG. 3, an illustrative set of data stores and/or data store servers is shown, corresponding to the data store servers 104 of the content distribution network 100 discussed above in FIG. 1. One or more individual data stores 301-313 may reside in storage on a single computer server 104 (or a single server farm or cluster) under the control of a single entity, or may reside on separate servers operated by different entities and/or at remote locations. In some embodiments, data stores 301-313 may be accessed by the content management server 102 and/or other devices and servers within the network 100 (e.g., user devices 106, supervisor devices 110, administrator servers 116, etc.). Access to one or more of the data stores 301-313 may be limited or denied based on the processes, user credentials, and/or devices attempting to interact with the data store.

The paragraphs below describe examples of specific data stores that may be implemented within some embodiments of a content distribution network 100. It should be understood that the below descriptions of data stores 301-313, including their functionality and types of data stored therein, are illustrative and non-limiting. Data stores server architecture, design, and the execution of specific data stores 301-313 may depend on the context, size, and functional requirements of a content distribution network 100. For example, in content distribution systems 100 used for professional training and educational purposes, separate databases or file-based storage systems may be implemented in data store server(s) 104 to store trainee and/or student data, trainer and/or professor data, training module data and content descriptions, training results, evaluation data, and the like. In contrast, in content distribution systems 100 used for media distribution from content providers to subscribers, separate data stores may be implemented in data stores server(s) 104 to store listings of available content titles and descriptions, content title usage statistics, subscriber profiles, account data, payment data, network usage statistics, etc.

A user profile data store 301, also referred to herein as a user profile database 301, may include information relating to the end users within the content distribution network 100. This information may include user characteristics such as the user names, access credentials (e.g., logins and passwords), user preferences, and information relating to any previous user interactions within the content distribution network 100 (e.g., requested content, posted content, content modules completed, training scores or evaluations, other associated users, etc.). In some embodiments, this information can relate to one or several individual end users such as, for example, one or several students, teachers, administrators, or the like, and in some embodiments, this information can relate to one or several institutional end users such as, for example, one or several schools, groups of schools such as one or several school districts, one or several colleges, one or several universities, one or several training providers, or the like. In some embodiments, this information can identify one or several user memberships in one or several groups such as, for example, a student's membership in a university, school, program, grade, course, class, or the like.

In some embodiments in which the one or several end users are individuals, and specifically are students, the user profile database 301 can further include information relating to these students' academic and/or educational history. This information can identify one or several courses of study that the student has initiated, completed, and/or partially completed, as well as grades received in those courses of study. In some embodiments, the student's academic and/or educational history can further include information identifying student performance on one or several tests, quizzes, and/or assignments. In some embodiments, this information can be stored in a tier of memory that is not the fastest memory in the content delivery network 100.

The user profile database 301 can include information relating to one or several student learning preferences. In some embodiments, for example, the student may have one or several preferred learning styles, one or several most effective learning styles, and/or the like. In some embodiments, the students learning style can be any learning style describing how the student best learns or how the student prefers to learn. In one embodiment, these learning styles can include, for example, identification of the student as an auditory learner, as a visual learner, and/or as a tactile learner. In some embodiments, the data identifying one or several student learning styles can include data identifying a learning style based on the student's educational history such as, for example, identifying a student as an auditory learner when the student has received significantly higher grades and/or scores on assignments and/or in courses favorable to auditory learners. In some embodiments, this information can be stored in a tier of memory that is not the fastest memory in the content delivery network 100.

The user profile database 301 can further include information relating to one or several teachers and/or instructors who are responsible for organizing, presenting, and/or managing the presentation of information to the student. In some embodiments, user profile database 301 can include information identifying courses and/or subjects that have been taught by the teacher, data identifying courses and/or subjects currently taught by the teacher, and/or data identifying courses and/or subjects that will be taught by the teacher. In some embodiments, this can include information relating to one or several teaching styles of one or several teachers. In some embodiments, the user profile database 301 can further include information indicating past evaluations and/or evaluation reports received by the teacher. In some embodiments, the user profile database 301 can further include information relating to improvement suggestions received by the teacher, training received by the teacher, continuing education received by the teacher, and/or the like. In some embodiments, this information can be stored in a tier of memory that is not the fastest memory in the content delivery network 100.

An accounts data store 302, also referred to herein as an accounts database 302, may generate and store account data for different users in various roles within the content distribution network 100. For example, accounts may be created in an accounts data store 302 for individual end users, supervisors, administrator users, and entities such as companies or educational institutions. Account data may include account types, current account status, account characteristics, and any parameters, limits, restrictions associated with the accounts.

A content library data store 303, also referred to herein as a content library database 303, may include information describing the individual content items (or content resources) available via the content distribution network 100. In some embodiments, the library data store 303 may include metadata, properties, and other characteristics associated with the content resources stored in the content server 112. Such data may identify one or more aspects or content attributes of the associated content resources, for example, subject matter, access level, or skill level of the content resources, license attributes of the content resources (e.g., any limitations and/or restrictions on the licensable use and/or distribution of the content resource), price attributes of the content resources (e.g., a price and/or price structure for determining a payment amount for use or distribution of the content resource), rating attributes for the content resources (e.g., data indicating the evaluation or effectiveness of the content resource), and the like. In some embodiments, the library data store 303 may be configured to allow updating of content metadata or properties, and to allow the addition and/or removal of information relating to the content resources. For example, content relationships may be implemented as graph structures, which may be stored in the library data store 303 or in an additional store for use by selection algorithms along with the other metadata.

A pricing data store 304 may include pricing information and/or pricing structures for determining payment amounts for providing access to the content distribution network 100 and/or the individual content resources within the network 100. In some cases, pricing may be determined based on a user's access to the content distribution network 100, for example, a time-based subscription fee, or pricing based on network usage and. In other cases, pricing may be tied to specific content resources. Certain content resources may have associated pricing information, whereas other pricing determinations may be based on the resources accessed, the profiles and/or accounts of the user, and the desired level of access (e.g., duration of access, network speed, etc.). Additionally, the pricing data store 304 may include information relating to compilation pricing for groups of content resources, such as group prices and/or price structures for groupings of resources.

A license data store 305 may include information relating to licenses and/or licensing of the content resources within the content distribution network 100. For example, the license data store 305 may identify licenses and licensing terms for individual content resources and/or compilations of content resources in the content server 112, the rights holders for the content resources, and/or common or large-scale right holder information such as contact information for rights holders of content not included in the content server 112.

A content access data store 306 may include access rights and security information for the content distribution network 100 and specific content resources. For example, the content access data store 306 may include login information (e.g., user identifiers, logins, passwords, etc.) that can be verified during user login attempts to the network 100. The content access data store 306 also may be used to store assigned user roles and/or user levels of access. For example, a user's access level may correspond to the sets of content resources and/or the client or server applications that the user is permitted to access. Certain users may be permitted or denied access to certain applications and resources based on their subscription level, training program, course/grade level, etc. Certain users may have supervisory access over one or more end users, allowing the supervisor to access all or portions of the end user's content, activities, evaluations, etc. Additionally, certain users may have administrative access over some users and/or some applications in the content management network 100, allowing such users to add and remove user accounts, modify user access permissions, perform maintenance updates on software and servers, etc.

A source data store 307 may include information relating to the source of the content resources available via the content distribution network. For example, a source data store 307 may identify the authors and originating devices of content resources, previous pieces of data and/or groups of data originating from the same authors or originating devices, and the like.

An evaluation data store 308 may include information used to direct the evaluation of users and content resources in the content management network 100. In some embodiments, the evaluation data store 308 may contain, for example, the analysis criteria and the analysis guidelines for evaluating users (e.g., trainees/students, gaming users, media content consumers, etc.) and/or for evaluating the content resources in the network 100. The evaluation data store 308 also may include information relating to evaluation processing tasks, for example, the identification of users and user devices 106 that have received certain content resources or accessed certain applications, the status of evaluations or evaluation histories for content resources, users, or applications, and the like. Evaluation criteria may be stored in the evaluation data store 308 including data and/or instructions in the form of one or several electronic rubrics or scoring guides for use in the evaluation of the content, users, or applications. The evaluation data store 308 also may include past evaluations and/or evaluation analyses for users, content, and applications, including relative rankings, characterizations, explanations, and the like.

A thread data store 309, also referred to herein as a thread database 309 can include information relating to one or several conversation threads, which can each include one or several user posts. In some embodiments, the thread data store 309 can include thread information identifying, for example, the number of users that can access a thread, the access level(s) of the users that can access a thread including, for example, a read-only access level, a read-write access level, or the like. In some embodiments, the thread information can include thread metadata that can identify one or several aspects of the thread including, for example, thread content, post or comment information, or the like. In some embodiments, the thread information can include thread user data that can track one or several user interactions with the thread such as, for example, user posts to the thread, metadata of user posts to the thread, activity level in the thread, or the like.

A threshold database 310, also referred to herein as a threshold database, can store one or several threshold values.

These one or several threshold values can delineate between states or conditions. In one exemplary embodiments, for example, a threshold value can delineate between an acceptable user performance and an unacceptable user performance, between content appropriate for a user and content that is inappropriate for a user, between risk levels, or the like.

A transmission data store 311 can include information relating to the transmission of information through the communication network 120. In some embodiments, this information can be specifically received from one or several hubs 602, 604, 606 relating to the transmission of information through those one or several hubs 602, 604, 606. In some embodiments, this information can relate to the performance of one or more of the hubs such as information identifying the time of transmission, the transmission speed, any transmission anomalies, or the like. In some embodiments the transmission database 311 can include information for some or all of the hubs. This information can identify, for example, the number of times that a hub has been identified as an error hub, the percent of transmissions in which the hub is identified as an error hub, or the like. In some embodiments, the transmission database can further include information The scan data store 312 can include information generated form the scanner 124. This information can include, for example, data corresponding to one or several variables of one or several pixels captured by the scanner 124. In some embodiments, these one or several variables can include, for example, one or several pixel values, which one or several pixel values can represent one or several of: color; brightness; contrast; and intensity of the pixel. In some embodiments, the scan database 312 can include the results of the scan of an item. These can include, for example, the identification of one or several characters and/or marks located on the scanned item.

In some embodiments, this data can relate to one or several lines of pixels and/or one or several pixel arrays. In embodiments in which the scanner 124 includes a line-scan camera, this data can include one or several sets of line data, each of which one or several sets of line data can comprise a single line of pixels. In some embodiments, the scan database 312 can include image data which can comprise an array of pixels, which array of pixels can comprise a plurality of lines of pixels generated by, for example, a line-scan camera. In some embodiments, for example, the server 102 can receive these lines of pixels and/or sets of line data from the scanner 124 and can arrange these lines of pixels and/or sets of line data into an array of pixels. In some embodiments, these sets of line data can be sequentially received in the order in which they were generated and/or captured, and in some embodiments, these sets of line data can be linked together to form an array of pixels in the same order in which they were generated and/or captured.

In addition to the illustrative data stores described above, data store server(s) 104 (e.g., database servers, file-based storage servers, etc.) may include one or more external data aggregators 313. External data aggregators 313 may include third-party data sources accessible to the content management network 100, but not maintained by the content management network 100. External data aggregators 313 may include any electronic information source relating to the users, content resources, or applications of the content distribution network 100. For example, external data aggregators 313 may be third-party data stores containing demographic data, education related data, sales data, health related data, and the like. Illustrative external data aggregators 313 may include, for example, social networking web servers, public records data stores, learning management systems, educational institution servers, business servers, consumer sales data stores, medical record data stores, etc. Data retrieved from various external data aggregators 313 may be used to verify and update user account information, suggest user content, and perform user and content evaluations.

Figure 4:
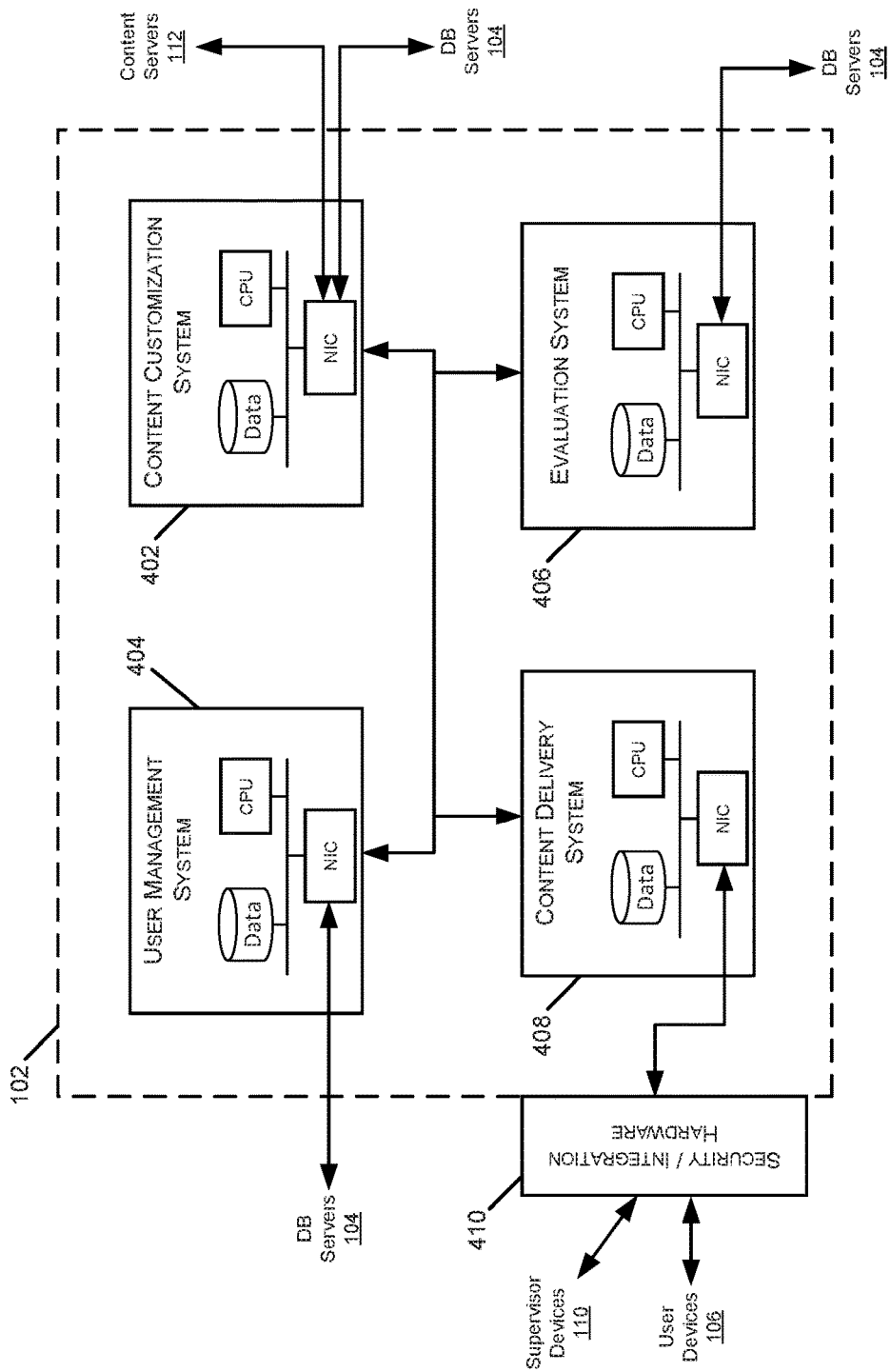
FIG. 4 is a block diagram illustrating an embodiment of one or more content management servers within a content distribution network.

With reference now to FIG. 4, a block diagram is shown illustrating an embodiment of one or more content management servers 102 within a content distribution network 100. As discussed above, content management server(s) 102 may include various server hardware and software components that manage the content resources within the content distribution network 100 and provide interactive and adaptive content to users on various user devices 106. For example, content management server(s) 102 may provide instructions to and receive information from the other devices within the content distribution network 100, in order to manage and transmit content resources, user data, and server or client applications executing within the network 100.

A content management server 102 may include a content customization system 402. The content customization system 402 may be implemented using dedicated hardware within the content distribution network 100 (e.g., a content customization server 402), or using designated hardware and software resources within a shared content management server 102. In some embodiments, the content customization system 402 may adjust the selection and adaptive capabilities of content resources to match the needs and desires of the users receiving the content. For example, the content customization system 402 may query various data stores and servers 104 to retrieve user information, such as user preferences and characteristics (e.g., from a user profile data store 301), user access restrictions to content recourses (e.g., from a content access data store 306), previous user results and content evaluations (e.g., from an evaluation data store 308), and the like. Based on the retrieved information from data stores 104 and other data sources, the content customization system 402 may modify content resources for individual users.

A content management server 102 also may include a user management system 404. The user management system 404 may be implemented using dedicated hardware within the content distribution network 100 (e.g., a user management server 404), or using designated hardware and software resources within a shared content management server 102. In some embodiments, the user management system 404 may monitor the progress of users through various types of content resources and groups, such as media compilations, courses or curriculums in training or educational contexts, interactive gaming environments, and the like. For example, the user management system 404 may query one or more databases and/or data store servers 104 to retrieve user data such as associated content compilations or programs, content completion status, user goals, results, and the like.

A content management server 102 also may include an evaluation system 406. The evaluation system 406 may be implemented using dedicated hardware within the content distribution network 100 (e.g., an evaluation server 406), or using designated hardware and software resources within a shared content management server 102. The evaluation system 406 may be configured to receive and analyze information from user devices 106. For example, various ratings of content resources submitted by users may be compiled and analyzed, and then stored in a data store (e.g., a content library data store 303 and/or evaluation data store 308) associated with the content. In some embodiments, the evaluation server 406 may analyze the information to determine the effectiveness or appropriateness of content resources with, for example, a subject matter, an age group, a skill level, or the like. In some embodiments, the evaluation system 406 may provide updates to the content customization system 402 or the user management system 404, with the attributes of one or more content resources or groups of resources within the network 100. The evaluation system 406 also may receive and analyze user evaluation data from user devices 106, supervisor devices 110, and administrator servers 116, etc. For instance, evaluation system 406 may receive, aggregate, and analyze user evaluation data for different types of users (e.g., end users, supervisors, administrators, etc.) in different contexts (e.g., media consumer ratings, trainee or student comprehension levels, teacher effectiveness levels, gamer skill levels, etc.).

A content management server 102 also may include a content delivery system 408. The content delivery system 408 may be implemented using dedicated hardware within the content distribution network 100 (e.g., a content delivery server 408), or using designated hardware and software resources within a shared content management server 102. The content delivery system 408 may receive content resources from the content customization system 402 and/or from the user management system 404, and provide the resources to user devices 106. The content delivery system 408 may determine the appropriate presentation format for the content resources based on the user characteristics and preferences, and/or the device capabilities of user devices 106. If needed, the content delivery system 408 may convert the content resources to the appropriate presentation format and/or compress the content before transmission. In some embodiments, the content delivery system 408 may also determine the appropriate transmission media and communication protocols for transmission of the content resources.

In some embodiments, the content delivery system 408 may include specialized security and integration hardware 410, along with corresponding software components to implement the appropriate security features content transmission and storage, to provide the supported network and client access models, and to support the performance and scalability requirements of the network 100. The security and integration layer 410 may include some or all of the security and integration components 208 discussed above in FIG. 2, and may control the transmission of content resources and other data, as well as the receipt of requests and content interactions, to and from the user devices 106, supervisor devices 110, administrative servers 116, and other devices in the network 100.

Figure 5:
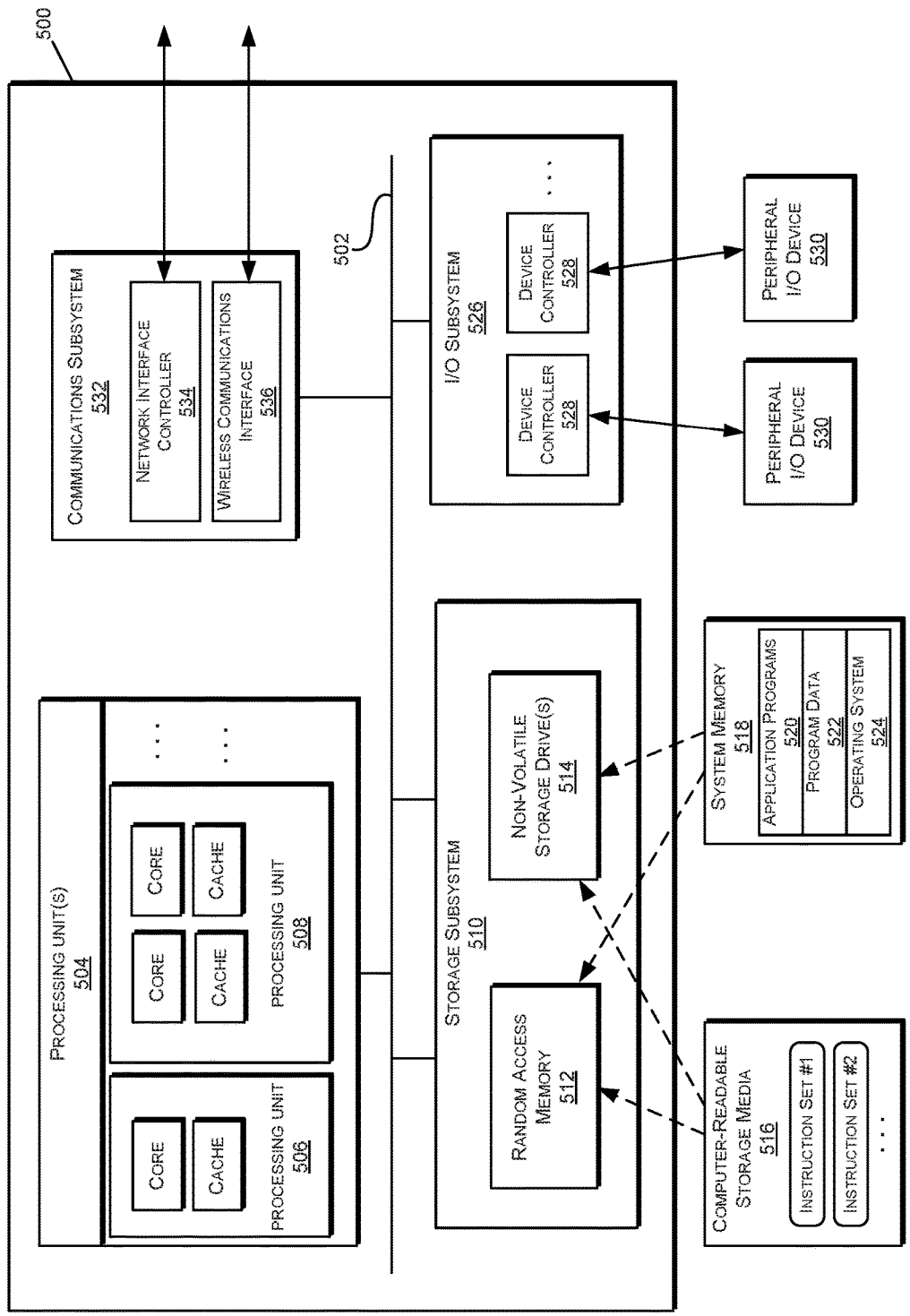
FIG. 5 is a block diagram illustrating the physical and logical components of a special-purpose computer device within a content distribution network.

With reference now to FIG. 5, a block diagram of an illustrative computer system is shown. The system 500 may correspond to any of the computing devices or servers of the content distribution network 100 described above, or any other computing devices described herein, and specifically can include, for example, one or several of the user devices 106, the supervisor device 110, and/or any of the servers 102, 104, 108, 112, 114, 116. In this example, computer system 500 includes processing units 504 that communicate with a number of peripheral subsystems via a bus subsystem 502. These peripheral subsystems include, for example, a storage subsystem 510, an I/O subsystem 526, and a communications subsystem 532.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which may be implemented as one or more integrated circuits (e.g., a conventional microprocessor or microcontroller), controls the operation of computer system 500. One or more processors, including single core and/or multicore processors, may be included in processing unit 504. As shown in the figure, processing unit 504 may be implemented as one or more independent processing units 506 and/or 508 with single or multicore processors and processor caches included in each processing unit. In other embodiments, processing unit 504 may also be implemented as a quad-core processing unit or larger multicore designs (e.g., hexa-core processors, octo-core processors, ten-core processors, or greater.

Processing unit 504 may execute a variety of software processes embodied in program code, and may maintain multiple concurrently executing programs or processes. At any given time, some or all of the program code to be executed can be resident in processor(s) 504 and/or in storage subsystem 510. In some embodiments, computer system 500 may include one or more specialized processors, such as digital signal processors (DSPs), outboard processors, graphics processors, application-specific processors, and/or the like.

I/O subsystem 526 may include device controllers 528 for one or more user interface input devices and/or user interface output devices 530. User interface input and output devices 530 may be integral with the computer system 500 (e.g., integrated audio/video systems, and/or touchscreen displays), or may be separate peripheral devices which are attachable/detachable from the computer system 500. The I/O subsystem 526 may provide one or several outputs to a user by converting one or several electrical signals to user perceptible and/or interpretable form, and may receive one or several inputs from the user by generating one or several electrical signals based on one or several user-caused interactions with the I/O subsystem such as the depressing of a key or button, the moving of a mouse, the interaction with a touchscreen or trackpad, the interaction of a sound wave with a microphone, or the like.

Input devices 530 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 530 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additional input devices 530 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 530 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, light-emitting diode (LED) displays, projection devices, touch screens, and the like. In general, use of the term "output device" is intended to include all possible types of devices and mechanisms for outputting information from computer system 500 to a user or other computer. For example, output devices 530 may include, without limitation, a variety of display devices that visually convey text, graphics and audio/video information such as monitors, printers, speakers, headphones, automotive navigation systems, plotters, voice output devices, and modems.

Computer system 500 may comprise one or more storage subsystems 510, comprising hardware and software components used for storing data and program instructions, such as system memory 518 and computer-readable storage media 516. The system memory 518 and/or computer-readable storage media 516 may store program instructions that are loadable and executable on processing units 504, as well as data generated during the execution of these programs.

Depending on the configuration and type of computer system 500, system memory 318 may be stored in volatile memory (such as random access memory (RAM) 512) and/or in non-volatile storage drives 514 (such as read-only memory (ROM), flash memory, etc.) The RAM 512 may contain data and/or program modules that are immediately accessible to and/or presently being operated and executed by processing units 504. In some implementations, system memory 518 may include multiple different types of memory, such as static random access memory (SRAM) or dynamic random access memory (DRAM). In some implementations, a basic input/output system (BIOS), containing the basic routines that help to transfer information between elements within computer system 500, such as during start-up, may typically be stored in the non-volatile storage drives 514. By way of example, and not limitation, system memory 518 may include application programs 520, such as client applications, Web browsers, mid-tier applications, server applications, etc., program data 522, and an operating system 524.

Storage subsystem 510 also may provide one or more tangible computer-readable storage media 516 for storing the basic programming and data constructs that provide the functionality of some embodiments. Software (programs, code modules, instructions) that when executed by a processor provide the functionality described herein may be stored in storage subsystem 510. These software modules or instructions may be executed by processing units 504. Storage subsystem 510 may also provide a repository for storing data used in accordance with the present invention.

Storage subsystem 300 may also include a computer-readable storage media reader that can further be connected to computer-readable storage media 516. Together and, optionally, in combination with system memory 518, computer-readable storage media 516 may comprehensively represent remote, local, fixed, and/or removable storage devices plus storage media for temporarily and/or more permanently containing, storing, transmitting, and retrieving computer-readable information.

Computer-readable storage media 516 containing program code, or portions of program code, may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 500.

By way of example, computer-readable storage media 516 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 516 may include, but is not limited to, Zip® drives, flash memory cards, universal serial bus (USB) flash drives, secure digital (SD) cards, DVD disks, digital video tape, and the like. Computer-readable storage media 516 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Communications subsystem 532 may provide a communication interface from computer system 500 and external computing devices via one or more communication networks, including local area networks (LANs), wide area networks (WANs) (e.g., the Internet), and various wireless telecommunications networks. As illustrated in FIG. 5, the communications subsystem 532 may include, for example, one or more network interface controllers (NICs) 534, such as Ethernet cards, Asynchronous Transfer Mode NICs, Token Ring NICs, and the like, as well as one or more wireless communications interfaces 536, such as wireless network interface controllers (WNICs), wireless network adapters, and the like. Additionally and/or alternatively, the communications subsystem 532 may include one or more modems (telephone, satellite, cable, ISDN), synchronous or asynchronous digital subscriber line (DSL) units, FireWire® interfaces, USB® interfaces, and the like. Communications subsystem 536 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem 532 may be detachable components coupled to the computer system 500 via a computer network, a FireWire® bus, or the like, and/or may be physically integrated onto a motherboard of the computer system 500. Communications subsystem 532 also may be implemented in whole or in part by software.

In some embodiments, communications subsystem 532 may also receive input communication in the form of structured and/or unstructured data feeds, event streams, event updates, and the like, on behalf of one or more users who may use or access computer system 500. For example, communications subsystem 532 may be configured to receive data feeds in real-time from users of social networks and/or other communication services, web feeds such as Rich Site Summary (RSS) feeds, and/or real-time updates from one or more third party information sources (e.g., data aggregators 313). Additionally, communications subsystem 532 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 532 may output such structured and/or unstructured data feeds, event streams, event updates, and the like to one or more data stores 104 that may be in communication with one or more streaming data source computers coupled to computer system 500.

Due to the ever-changing nature of computers and networks, the description of computer system 500 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 6:
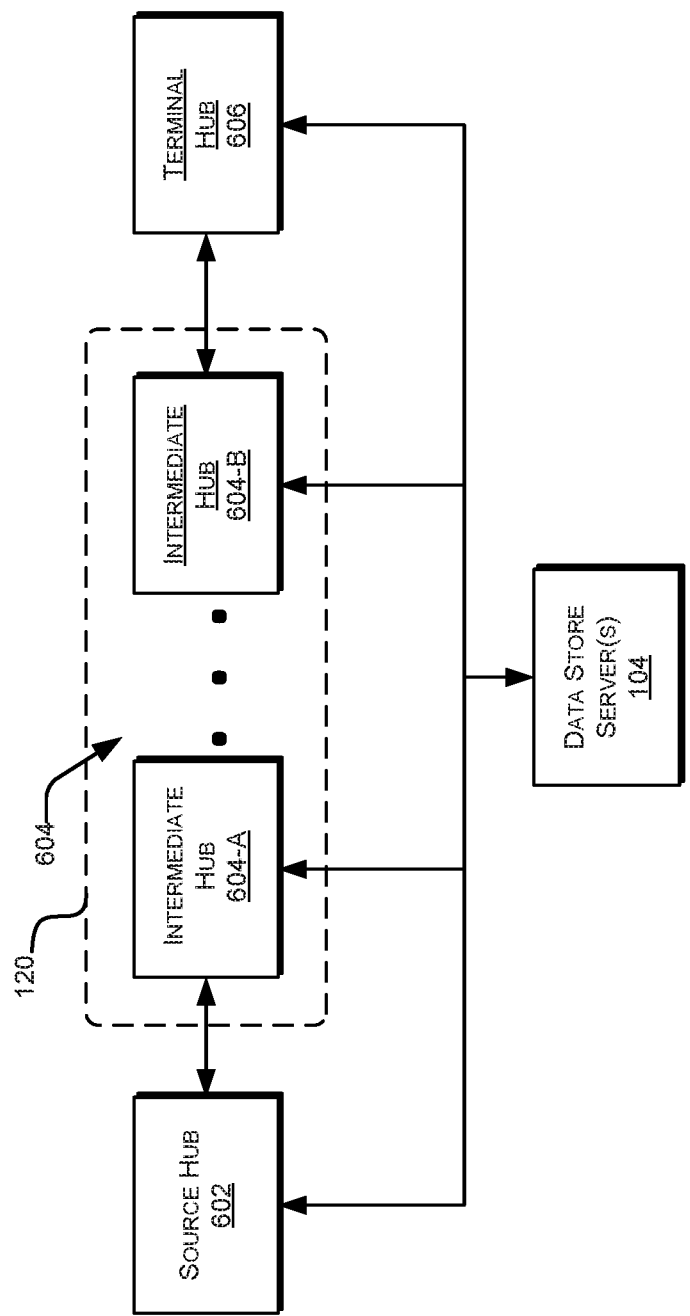
FIG. 6 is a block diagram illustrating one embodiment of the communication network.

With reference now to FIG. 6, a block diagram illustrating one embodiment of the communication network 120 is shown. Specifically, FIG. 6 depicts one hardware configuration in which messages are exchanged between a source hub 602 via the communication network 120 that can include one or several intermediate hubs 604. In some embodiments, the source hub 602 can be any one or several components of the content distribution network generating and initiating the sending of a message, and the terminal hub 606 can be any one or several components of the content distribution network 100 receiving and not re-sending the message. In some embodiments, for example, the source hub 602 can be one or several of the user device 106, the supervisor device 110, and/or the server 102, and the terminal hub 606 can likewise be one or several of the user device 106, the supervisor device 110, and/or the server 102. In some embodiments, the intermediate hubs 604 can include any computing device that receives the message and resends the message to a next node.

As seen in FIG. 6, in some embodiments, each of the hubs 602, 604, 606 can be communicatingly connected with the data store 104. In such embodiments, some or all of the hubs 602, 604, 606 can send information to the data store 104 identifying a received message and/or any sent or resent message. This information can, in some embodiments, be used to determine the completeness of any sent and/or received messages and/or to verify the accuracy and completeness of any message received by the terminal hub 606.

In some embodiments, the communication network 120 can be formed by the intermediate hubs 604. In some embodiments, the communication network 120 can comprise a single intermediate hub 604, and in some embodiments, the communication network 120 can comprise a plurality of intermediate hubs. In one embodiment, for example, and as depicted in FIG. 6, the communication network 120 includes a first intermediate hub 604-A and a second intermediate hub 604-B.

Figure 7A:
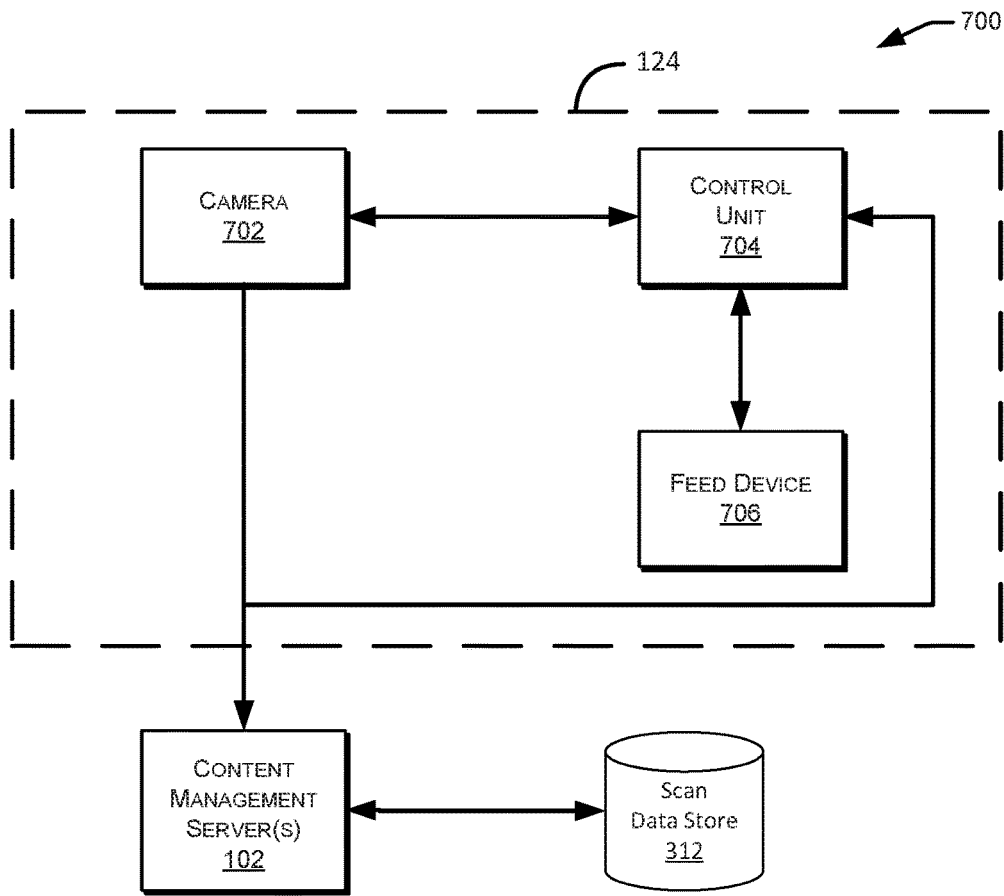
FIG. 7A is a schematic illustration of one embodiment of scanner.

With reference now to FIG. 7A, a schematic illustration of one embodiment of scanner 124. The scanner 124 can include a camera 702. The camera 702 can be, for example, a digital camera. In some embodiments, the digital camera can be a line-scan camera that outputs a single row of pixels, and in some embodiments, the digital camera can be an area-scan camera that outputs an array of pixels. The camera 702 can generate data from a portion of an object, referred to herein as the "scanned object" within an imaging area. In some embodiments, this portion of the scanned object can comprise the entire scanned object, or less than the entire scanned object such as part of the scanned object.

The camera 702 can be communicatingly connected to a control unit 704. The control unit 704, also referred to herein as a "timing circuit," can control the operation of the camera 702. In some embodiments, this can include controlling one or several parameters of the camera such as the exposure rate. As used herein, the "exposure rate" refers to the frequency with which the camera 702 generates data such as, for example, a set of line data. In some embodiments, the control unit 704 can receive the data generated by the camera 702 from the scanned item. The control unit 704 can perform one or several operations on the received data and/or with the received data to determine, for example, growth and/or size of the scanned item, skew and/or rotation of the scanned item, an ideal exposure rate, or the like. In some embodiments, the control unit 704 can manipulate some or all of the data received from the camera to compensate for, for example skew or rotation of the scanned item.

The control unit 704 can comprise a variety of components. In some embodiments, the control unit 704 can comprise one or several circuits and/or components that can receive data from the camera 702, and can, based on the received data, identify one or several camera operation parameters for modification and/or modify the one or several camera operation parameters. In some embodiments, these one or several components can include, for example, one or several computer chips, integrated circuits including for example, one or several application-specific integrated circuits (ASIC), gate arrays including one or several field-programmable gate arrays (FPGA), or the like. In some embodiments, Such FPGAs can contain an array of programmable logic blocks, and a hierarchy of reconfigurable interconnects that allow the blocks to be "wired together", like many logic gates that can be inter-wired in different configurations. Logic blocks can be configured to perform complex combinational functions, or merely simple logic gates like AND and XOR. In most FPGAs, logic blocks also include memory elements, which may be simple flip-flops or more complete blocks of memory.

In some embodiments, the control unit 704 and/or the components of the control unit 704 can be controlled by computer codes that can be stored in memory associated with the control unit 704 and/or components of the control unit 704. In some embodiments, this computer code can comprise a hardware description language (HDL). In some embodiments, the control unit 704 can operate according to some or all of the algorithms disclosed herein.

In some embodiments, the control unit 704 can include a clock, a summing circuit (summer circuit), a subtractor (subtractor circuit), an adder-subtractor (adder-subtractor circuit), a multiplier circuit which can be a binary or analog multiplier, a divider circuit, or the like. In some embodiments, the control unit 704 can be configured to generate a capture signal and send the capture signal to the camera 702. This capture signal can direct the camera to generate a set of line data and/or to generate one or several pixel values corresponding to a portion of the scanned item in the imaging area.

The control unit can generate the capture signal by dividing a clock rate by a divisor which can be formed, at least in part, based on a variable component. In some embodiments, this variable component can change based on whether the frequency with which current capture signals are sent is too high or too low. In some embodiments, the summer circuit can add the variable component to other components, such as fixed components that can be, for example, received from the user of the scanner 124, forming the divisor. The clock signals can be received from the clock, and the frequency of the divider circuit can divide the clock signals by the divisor to create a line rate identifying the frequency with which capture signals are generated. The control unit 704 can then, based on the line rate, generate and send one or several capture signals to the camera 702.

The control unit 704 can be communicatingly connected to a feed device 706. The feed device 706 can control the advance of the scanned item through the imaging area. In some embodiments the feed device can comprise one or several conveying mechanisms, conveyors, mechanized rollers, or the like. In some embodiments, the control unit 704 can provide one or several control signals to the feed device 706, which control signals control whether the feed device 706 moves the scanned item with respect to the imaging area, the rate of movement of the scanned item with respect to the imaging area, or the like.

In some embodiments, and as depicted in FIG. 7A, one or both of the control unit 704 and the camera 702 can be communicatingly connected with the server 102. In some embodiments, for example, the server 102 can receive data, such as one or several pixels, lines of pixels, or arrays of pixels from the camera 702 and/or from the control unit 704. In one embodiment, for example, the server 102 can sequentially receive lines of pixels from the camera 702 and/or from the control unit 704 in the same order in which the lines of pixels are generated by the camera 702. In some embodiments, the server 102 can receive composite lines from the control unit 704, which composite lines are generated from sets of line data received from the camera 702. In some embodiments, a composite line can be generated from a plurality of lines of pixels to compensate for, for example, skew or rotation of the scanned item.

The content management server 102 can be communicatingly coupled to the scan database 312 of the database server 104. In some embodiments, the server 102 can create image data from the data received from the scanner 124. This image data can be stored, by the server 102, in the scan database 312.

Figure 7B:
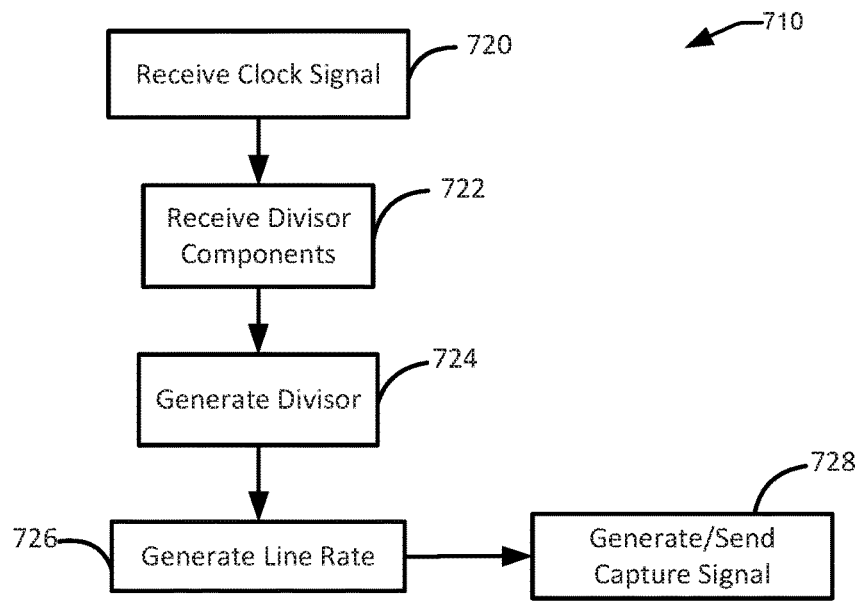
FIG. 7B is a flowchart illustrating one embodiment of a process for controlling the camera of the scanner.

With reference now to FIG. 7B, a flowchart illustrating one embodiment of a process 710 for controlling the camera 702 of the scanner 124 is shown. In some embodiments, the process 710 can be performed by the control unit 704 and/or components thereof. The process 710 begins at block 720, wherein a clock signal is received. In some embodiments, the clock signal comprises a plurality of signals establishing a clock frequency. The clock signal can be received from the clock by other components of the control unit 704, and particularly can be received by the divider.

After the clock signal has been received, the process 710 proceeds to block 722, wherein divisor components are received. In some embodiments, these divisor components can be received by the summer circuit, and these divisor components can include, for example, a fixed component and a variable component. In some embodiments, the variable component can change based on the difference between the number of lines of pixels or the number of sets of line data between consecutive row marks and ideal spacing data.

After the divisor components have been received, the process 710 proceeds to block 724, wherein the divisor is generated. In some embodiments, the divisor can be generated by adding the divisor components with the summer circuit, or adding values generated based on the divisor components with the summer circuit. After the divisor has been generated, the process 710 proceeds to block 726, wherein the line rate is generated. In some embodiments, the line rate can be generated by dividing the clock frequency by the divisor with the divider circuit.

After the line rate has been generated, the process 710 proceeds to block 728, wherein a capture signal is generated and/or sent. In some embodiments, the capture signal can direct the camera 702 to generate and/or capture data of the portion of the scanned item 800 in the imaging area. The capture signal can be generated by the control unit 704 and can be based on the line rate.

Figure 8:
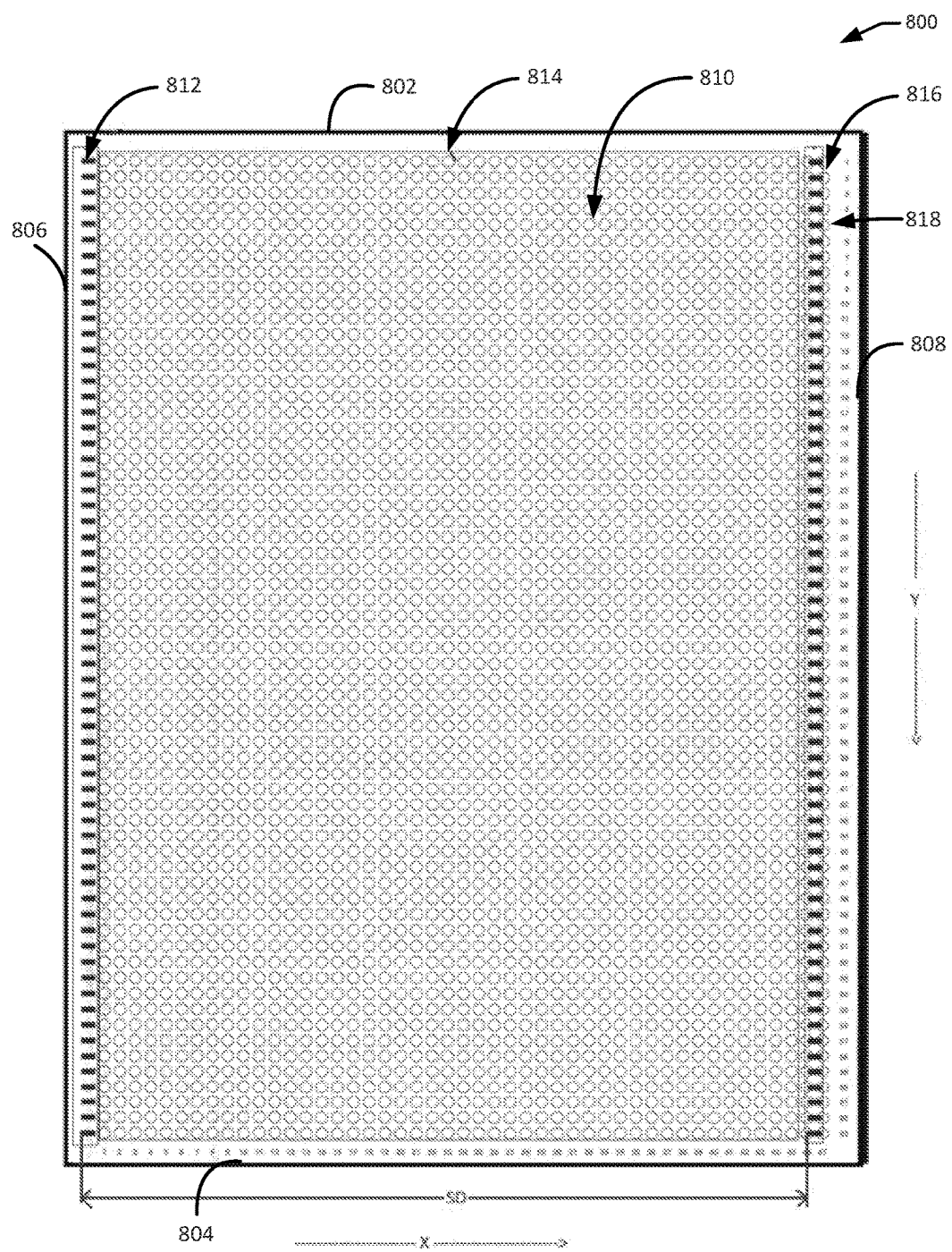
FIG. 8 is a depiction of one embodiment of a scanned item.

With reference now to FIG. 8, a depiction of one embodiment of a scanned item 800 is shown. The scanned item 800 can comprise a variety of shapes and sizes, and can be made from a variety of materials. In some embodiments, the scanned item 800 can comprise one or several planar pieces which can be, for example, one or several sheets of material. The scanned item 800 can include a top 802, a bottom 804, a first side 806, and a second side 808. In some embodiments, the scanned item can have a length extending between the top 802 and the bottom 804 and a width extending between the first side 806 and the second side 808. The scanned item 800 can further include a face 810 and a back (not shown). In some embodiments, one or both of the face 810 and the back can be imaged by the scanner 124.

In some embodiments, the scanned item 800 can include markings 812, 814, 816. Some of the markings 812, 814, 816 can facilitate the operation of the scanner 124. The markings can include row marks 812, 816 which can include a first group of row marks 812 and a second group of row marks 816. In some embodiments, the first group of row marks 812 can be located along the first side 806 of the scanned item 800 and extending from the top 802 to the bottom 804 of the scanned item 800. In some embodiments, the first group of row marks 812 can be arranged in a line. In some embodiments, the second group of row marks 816 can be located along the second side 808 of the scanned item 800 and extending from the top 802 to the bottom 804 of the scanned item 800. In some embodiments, the second group of row marks 816 can be arranged in a line. In some embodiments, each mark of the first group of row marks 812 is paired with one of the second group of row marks 816. In some embodiments, a mark of the first group of row marks 812 is paired with one of the second group of row marks 816 such that the mark of the first group of row marks 812 and the one of the second group of row marks 816 are the same distance from the top 802 and/or the bottom 804 of the scanned item 800.

The row marks 812, 816 can comprise a variety of shapes, sizes, and colors. In some embodiments, the row marks 812, 816 can each comprise the same shape, size, and color. As specifically depicted in FIG. 8, in some embodiments, the row marks 812, 816 can each comprise a black rectangle.

The markings can further include one or several response area delineators 814, also referred to herein as "answer bubbles." As referred to herein, a "response area" is the area delineated by the answer bubbles, a "response area position" is a location of a scanned item 800 of one or several response areas, and a "standard response area position" is an expected or desired location of a response area on a scanned item 800 of a specified size. In some embodiments, the one or several answer bubbles 814 can form an array of answer bubbles 814. In some embodiments, the answer bubbles 814 can be arranged in a plurality of rows 818, each of which rows 818 extend from the first side 806 to the second side 808 of the scanned item 800. In some embodiments, and as depicted in FIG. 8, each of these rows 818 is associated with a one of the first group of row marks 812 and one of the second group of row marks 814. In some embodiments, each of these rows 818 is associated with row marks such that the answer bubbles 814 forming the row and the row marks forming the row are the same distance from the top 802 and/or bottom 804 of the scanned item 800.

Figure 9:
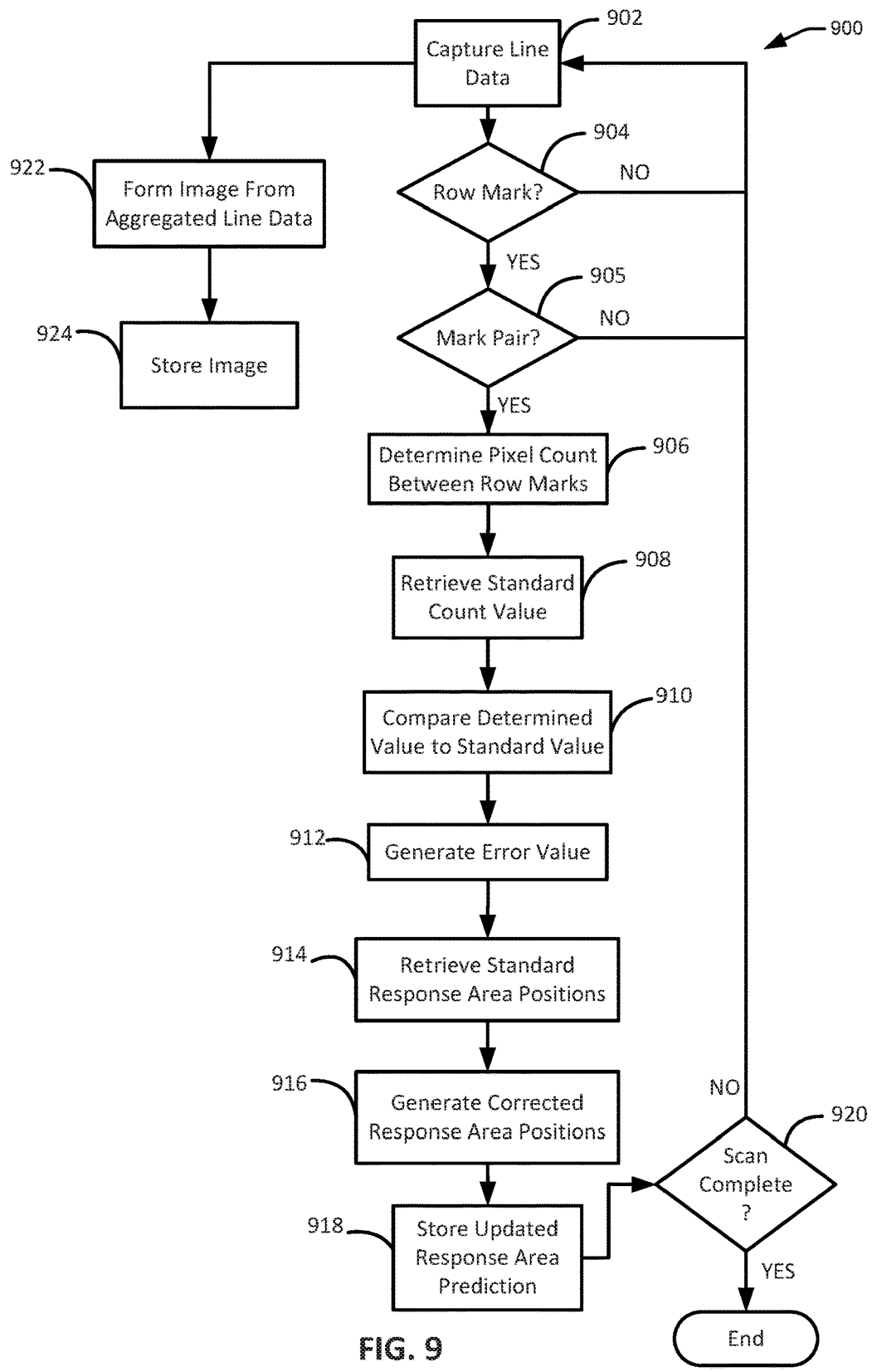
FIG. 9 is a flowchart illustrating one embodiment of a process for growth compensation of a scanned item.

With reference now to FIG. 9, a flowchart illustrating one embodiment of a process 900 for growth compensation of a scanned item 800 is shown. In some embodiments, the process 900 can compensate for growth of scanned items 800 that can occur due to, for example, changes in air humidity in the area in which the scanned items 800 are located. In some embodiments, as the process 900 is performed separate from the creation of the image data by the server 102, but rather is performed in the scanner 124, the overall operation speed of the scanner 124 is increased as the growth compensation can be performed simultaneous with the generation of sets of line data as opposed to after the image data is generated from all of the sets of line data.

The process 900 can be performed by the content distribution network 100 and/or one or several components thereof, and specifically can be performed by the scanner 124.

The process 900 begins at block 902, wherein data is captured by the camera 702. In some embodiments, data captured by the camera can comprise one or several pixel values for one or several pixels. In some embodiments, the data captured in block 902 can comprise line data such as a line of pixels, and in some embodiments, the data captured in block 902 can comprise an array of pixels.

In some embodiments, this data captured by the camera can be generated from a portion of the scanned item, which portion of the scanned object can comprise the entire scanned object, or less than the entire scanned object such as part of the scanned object. This portion of the scanned item can be located in the imaging area.

After the data has been captured, the process 900 proceeds to decision state 904, wherein it is determined if a row mark is included in the data captured in block 902 or with the data captured in block 902. In some embodiments, this determination can be performed by the control unit 704. This determination can include evaluating one or several pixels according to criteria for determination of the presence of a row mark. In some embodiments, this can include identifying a row mark when a group of pixels has, for example, a specified: color; intensity; size; and/or shape. In some embodiments, for example, a row mark can be identified when a plurality of sets of line data each include groups of pixels having a specified color; location; intensity; and/or length. In some embodiments, for example, a row mark can be identified when a specified number of pixels or a number of pixels within a specified range, and having a specified intensity or color or an intensity or color within a specified range, are identified at a specified location or within a range of specified locations in each of 2, 3, 4, 5, 6, 7, 8, 9, 10, 15, 20, and/or any other or intermediate number of lines of pixels.

In some embodiments in which a row mark is identified based on pixels meeting certain criteria in multiple lines of pixels, the line data captured in block 902 may contain pixels qualifying as a possible row mark. In some embodiments, decision state 904 can further include determining if the captured line data contains a potential row mark. In such embodiments, the control unit 704 can evaluate one or several pixels in the captured line data according to criteria for determination of the presence of a potential row mark. This can include identifying a potential row mark when a group of pixels has, for example, a specified: color; intensity; size; and/or shape. In some embodiments, for example, a potential row mark can be identified when a set of line data each includes a group of pixels having a specified color; location; intensity; and/or length. In some embodiments, for example, a row mark can be identified when a specified number of pixels or a number of pixels within a specified range, and having a specified intensity or color or an intensity or color within a specified range, and/or are identified at a specified location or within a range of specified locations.

If a potential row mark is identified, decision state 904 can include determining if the potential row mark completes a row mark. In some embodiments, this can include determining whether the immediately previous one or several sets of line data contained one or several potential row marks that, in combination with the potential row mark in the line data captured in block 902 create a row mark.

If a row mark is not identified, then the process 900 returns to block 902 and the process 900 proceeds as outlined above. If a row mark is identified, then the process 900 proceeds to decision state 905, wherein it is determined if the identified row mark completes a mark pair. As used herein, a mark pair is two row marks that can be adjacent so as to have no intervening row marks. In some embodiments a mark pair is two row marks that are adjacent along the length of the scanned item. In some embodiments determining if the identified row mark completes a mark pair can include determining whether any other row marks have been identified on the scanned item 800, and specifically can include determining whether any other row marks having the same approximate location along the width of the scanned item 800 have been identified on the scanned item 800. If such an other row mark is identified, then a mark pair is completed.

If a mark pair is not completed, then the process 900 returns to block 902 and proceeds as outlined above. If a mark pair is completed, then the process 900 proceeds to block 906, wherein a pixel count between the row marks forming the mark pair is determined. In some embodiments, this can include determining the number of sets of line data between the row marks forming the mark pair. This determination can be performed by the control unit 704.

After the pixel count between the row marks forming the row pair has been determined, the process 900 proceeds to block 908, wherein the standard count value is retrieved. In some embodiments, the standard count value can identify the expected number of pixels and/or sets of line data or lines of pixels between the row marks forming the mark pair. This standard count value can be determined based on information associated with the scanned item 800, which information can be input into the scanner 124 or other component of the content distribution network 100. In some embodiments, the standard count value can be stored in one of the databases 104 of the content distribution network 100, and can be specifically stored in the scan database 312. In some embodiments, this standard count value can be stored in memory associated with the control unit 704. In some embodiments, the standard count value can be retrieved from the location at which it is stored in block 908.

After the standard count value has been retrieved, the process 900 proceeds to block 910, wherein the determined pixel count of block 906 is compared to the standard count value of block 908. After the determined pixel count of block 906 is compared to the standard count value of block 908, the process 900 proceeds to block 912, wherein an error value is generated. In some embodiments, this error value can characterize a difference between the determined pixel count of block 906 and the standard count value of block 908. This difference can be measured in pixels, lines of pixels, a percent, or the like. In some embodiments, the error value can characterize the degree to which the size of the scanned item 800 along the length and/or width of the scanned item differs from an expected size.

After the error value has been generated, the process 90 proceeds to block 914, wherein standard response area positions are determined. In some embodiments, the standard response area positions can define the location of one or several response areas with respect to one or several features of the scanned item 800. In some embodiments, for example, a standard response area position can identify the location of a response area of a scanned item with respect to one or more of the top 802, bottom 804, first side 806, second side 808, and one or more of one or both of the first group of row marks 812 and the second group of row marks 816 of the scanned item 800. In some embodiments, the standard response area positions can be determined by retrieving information identifying the standard response area positions. In some embodiments, this information can be stored in one of the databases 104 and/or in memory associated with the control unit 704.

After the standard response area position information has been retrieved, the process 900 proceeds to block 916, wherein corrected response area positions are generated. In some embodiments, the corrected response area positions can be generated by applying the error value to the standard response area positions. Specifically, in some embodiments a corrected response area position can be generated for each of the response areas designated by the standard response area positions. In some embodiments, the corrected response area positions can be generated by the control unit 704 of the scanner 124. In some embodiments, and after the corrected response area positions have been generated, block 916 can include identifying one or several responses in one or several of the response areas as identified in one or several previously received sets of line data. These one or several responses can then be used to determine a score for responses provided via the scanned item, which score can reflect, for example, the number of items answered correctly and/or incorrectly.

After the corrected response area positions have been generated, the process 900 proceeds to block 918, wherein the corrected response area positions are stored. In some embodiments, these response area positions can be predicted response area positions. In some embodiments, this can include storing the corrected response area positions in memory associated with the control unit 704 and/or in one of the databases such as the scan database 312. After the corrected response area positions have been stored, the process 900 proceeds to decision state 920, wherein it is determined if the scan of the scanned item 800 is complete. In some embodiments, this can include determining if the scanned item 800 has moved completely through the scanner 124. If it is determined that the scan is not complete, then the process 900 can return to block 902 and proceed as outlined above. In some embodiments, the return to block 902 can include the control unit 704 controlling the feed device 706 to move the scanned item 800 such that a previously unscanned portion of the scanned item 800 is positioned within the imaging area for scanning. If the scan is completed, the process 900 can end.

Returning again to block 902, in some embodiments, and after the line data has been generated by the camera 702, the camera 702 can send the line data to the server 102, which server can generate an image or image data as indicated in block 922. In some embodiments, for example, the server 102 can compile a plurality of sets of line data to form image data comprising an array of pixels. After the image has been formed, the process 900 can proceed to block 924, wherein the image is stored. In some embodiments, the image can be stored in one of the databases 104, and specifically within the scan database 312.

Figure 10:
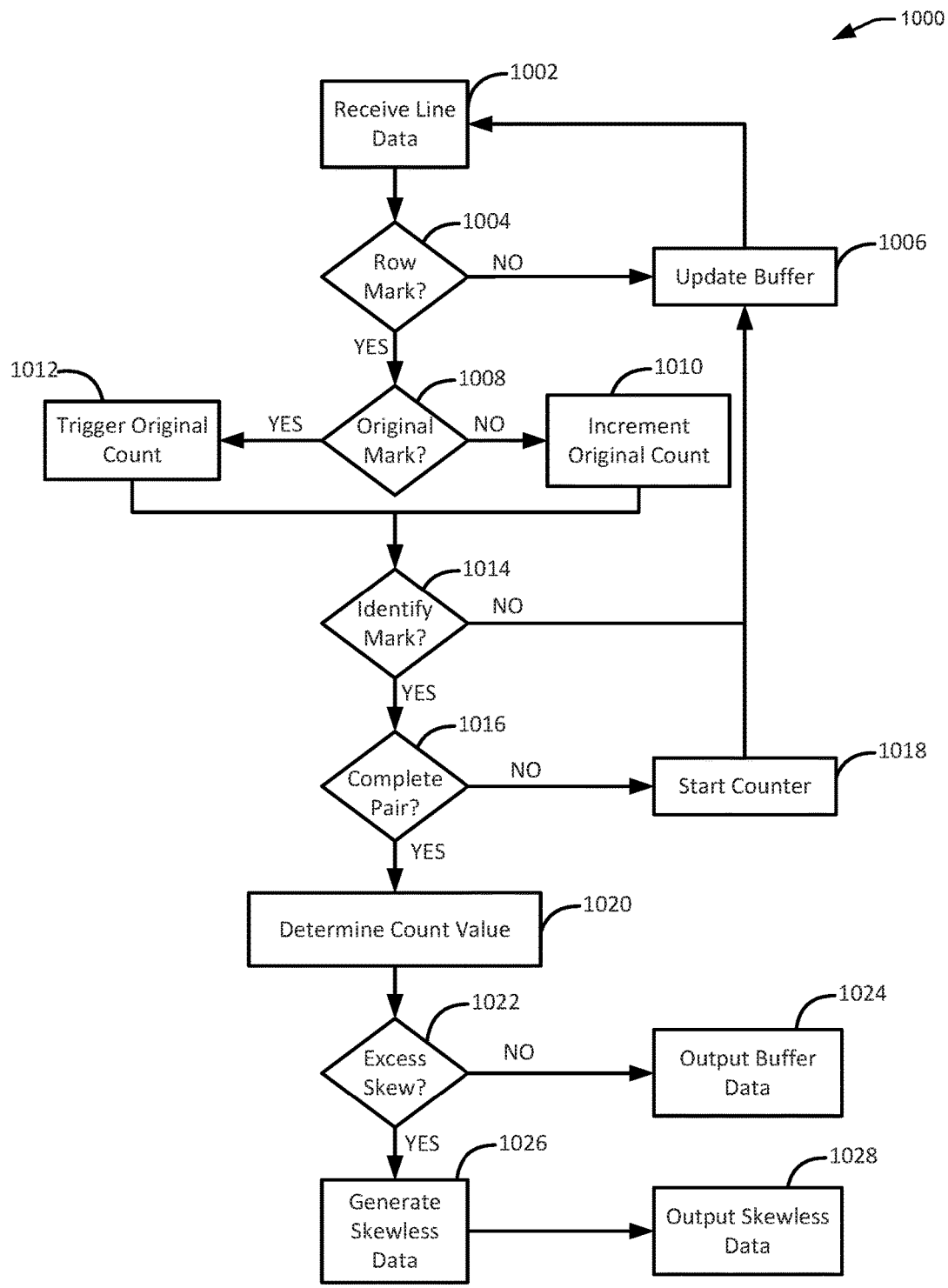
FIG. 10 is a flowchart illustrating one embodiment of a process for skew compensation of a scanned item.

With reference now to FIG. 10, a flowchart illustrating one embodiment of a process 1000 for skew compensation of a scanned item 800 is shown. The process 1000 can be performed by the scanner 124, and specifically by the camera 702, the control unit 704, and the feed device 706 of the scanner 124. The process 1000 begins at block 1002 wherein the line data is received. In some embodiments, the line data is received from the camera 702 by the control unit 704.

After the line data has been received, the process 1000 proceeds to decision state 1004 wherein it is determined if the line data contains a potential row mark, and specifically one or several potential row marks. In some embodiments, this determination can be performed by the control unit 704. This determination can include evaluating one or several pixels in the line data according to criteria for determination of the presence of a row mark. In some embodiments, this can include identifying a potential row mark when a group of pixels has, for example, a specified: color; intensity; size; and/or shape. In some embodiments, for example, a potential row mark can be identified when a plurality of sets of line data each include groups of pixels having a specified color; location; intensity; and/or length. In some embodiments, for example, a potential row mark can be identified when a specified number of pixels or a number of pixels within a specified range, and having a specified intensity or color or an intensity or color within a specified range, are identified at a specified location or within a range of specified locations.

If it is determined that no potential row mark is contained in the line data, then the process 1000 proceeds to block 1006 wherein a buffer is updated. In some embodiments, updating the buffer can include storing the line data generated in block 1002 in the buffer. In some embodiments, the buffer can comprise memory such as cache memory associated with the control unit 704. In some embodiments, the buffer can contain one or several sets of line data such as, for example, between 0 and 500 sets of line data, between 10 and 250 sets of line data, between 50 and 100 sets of line data, approximately 100 sets of line data, approximately 80 sets of line data, approximately 64 or 60 sets of line data, approximately 50 sets of line data and/or any other or intermediate number of sets of line data. As used herein, "approximately" denotes a range of plus or +/−10% of the value with which the word approximately is associated.

In some embodiments, the number of sets of line data stored in the cache and/or buffer can be limited. In such embodiments, updating the buffer can further include discarding one or several sets of line data from the buffer in addition to the addition of the line data at block 1002 to the buffer. After the buffer has been updated, the process 1000 can return to block 1002 and proceed as outlined above.

Returning again to decision state 1004, if it is determined that a potential row mark is identified, the process 1000 proceeds to steps 1008 through 1012 wherein it is determined if the potential row mark is an actual row mark. Specifically, the process 1000 proceeds to decision state 1008 wherein it is determined of the potential row mark is an original potential row mark. As used herein, an original potential row mark is a potential row mark for which row mark account has not already been triggered. Alternatively, an original potential row mark is a potential row mark identified in line data received in block 902 and not in previously received line data. In some embodiments, the determination of an original potential row mark can include determining whether a count associated with the position of the potential row mark identified and block 1004 has already been triggered. If a row mark is not an original row mark and a count associated with the position of the potential row mark has already been triggered, then the process 1000 proceeds to block 1010 wherein the previously triggered count, also referred to herein as the original count is incremented. Returning again to decision state 1008, if it is determined that the row mark is an original row mark, then the process 1000 proceeds to block 1012 wherein an original count is triggered and/or incremented.

After blocks 1010 or 1012, the process 1000 proceeds to decision state 1014 wherein it is determined whether to identify the potential row mark as a row mark. In some embodiments, for example in which a row mark can be identified when a specified number of pixels or a number of pixels within a specified range, and having a specified intensity or color or an intensity or color within a specified range, are identified at a specified location or within a range of specified locations in each of 2, 3, 4, 5, 6, 7, 8, 9, 10, 15, 20, and/or any other or intermediate number of lines of pixels, the potential row mark can be identified as a row mark when the value of the original count indicates the desired number of lines of pixels. In some embodiments, this determination can be made by comparing the value of the original count to a threshold. In some embodiments, the identification of a row mark in decision state 1014 can include adding a value indicative of unidentified row mark. In some embodiments, this value can be stored in memory associated with the control unit 704.

If the potential row mark is not identified as a row mark, than the process 1000 returns to block 1006 and proceeds as outlined above. Alternatively, if the potential row mark is identified as a row mark, then the process 1000 proceeds to decision state 1016 wherein it is determined if the identified row mark completes a lateral pair. As referred to herein, a lateral pair is a row mark from the first group of row marks 812 and a row mark from the second group of row marks 816 that each identify the same row 818 of answer bubbles 814.

In some embodiments, this determination can include determining whether a row mark has been currently or previously identified that is joinable with the row mark identified in decision state 1014 to form a lateral pair.

In some embodiments, determining if an identified row mark completes a lateral pair can include, for example, determining whether the identified row mark belongs to the first group of row marks 812 or the second group of row marks 816. In some embodiments, determining if an identified row mark completes a lateral pair can further include, for example, determining whether a row mark in the other of the first group of row marks 812 and the second group of row marks 816 has been identified and not linked with another row mark in a lateral pair.

If it is determined that the identified row mark does not complete a mark pair, then the process 1000 proceeds to block 1018 wherein a counter, and specifically a pair counter is triggered. In some embodiments, the pair counter can count the number of lines of pixels along the length of the scanned item 800 between row marks forming a lateral pair. In some embodiments, the pair counter can be triggered and can then be incremented for each subsequently received set of line data that does not include a row mark completing a lateral pair with the identified row mark triggering the counter. After the pair counter has been triggered, the process 1000 returns to block 1006, and proceeds as outlined above.

Returning again to decision state 1016, if it is determined that the row mark identified in decision state 1014 completes a lateral pair, then the process 1000 proceeds to block 1020, wherein the count value is determined. In some embodiments, the count value can be the value of the pair counter at the time that the row mark completing the lateral pair was identified.

After the count value has been determined, the process 1000 proceeds to decision state 1022, wherein it is determined if there is excessive skew in the scanned data. In some embodiments, this can include retrieving a skew threshold form the threshold database 310. In some embodiments, this skew threshold can delineate between acceptable and unacceptable skew levels. In some embodiments, and as used herein "skew" identifies or characterizes the separation along the length of the scanned item between row marks forming the lateral pair of row marks. In some embodiments, the skew can specifically identify or characterize the number of lines of pixels separating, along the length of the scanned item 800, row marks forming the lateral pair of row marks.

After the skew threshold has been received, the skew threshold can be compared to the count value to determine if the skew is acceptable or unacceptable. In some embodiments, the skew is acceptable when the number of lines of pixels separating the row marks forming the lateral pair is less than the skew threshold. In some embodiments, the skew is unacceptable when the number of lines of pixels separating the row marks forming the lateral pair is greater than the skew threshold. If it is determined that the skew is acceptable, or in other words, that there is not excess skew, then the process 1000 proceeds to block 1024, wherein buffer data is output. In some embodiments, the output buffer data comprise the one or several sets of line data containing the row identified by the row marks forming the lateral pair. In some embodiments, the buffer data can be output from the control unit 704 to the server 102. In some embodiments, the server 102 can generate image data from the received buffer output and can store the image data in one of the databases 104.

Returning again to decision state 1022, if it is determined that there is excess skew, then the process 1000 proceeds to block 1026, wherein skewless data is generated. In some embodiments, the skewless data can be generated by forming replacement sets of line data from the data contained in the buffer. In some embodiments, these replacement sets of line data can be generated from the buffer data so as to eliminate or minimize skew. In some embodiments, a replacement set of line data can be generated by identifying the row marks forming the lateral pair, identifying the pixels extending between the row marks forming the lateral pair, and selecting those identified pixels. In some embodiments, the skewless data can be generated by the control unit 704.

After the skewless data has been generated, the process 1000 proceeds to block 1028, wherein the skewless data is outputted from the buffer. In some embodiments, the skewless data can be outputted from the buffer to the server 102. In some embodiments, the server 102 can generate image data from the received skewless data and can store the image data in one of the databases 104.

Figure 11:
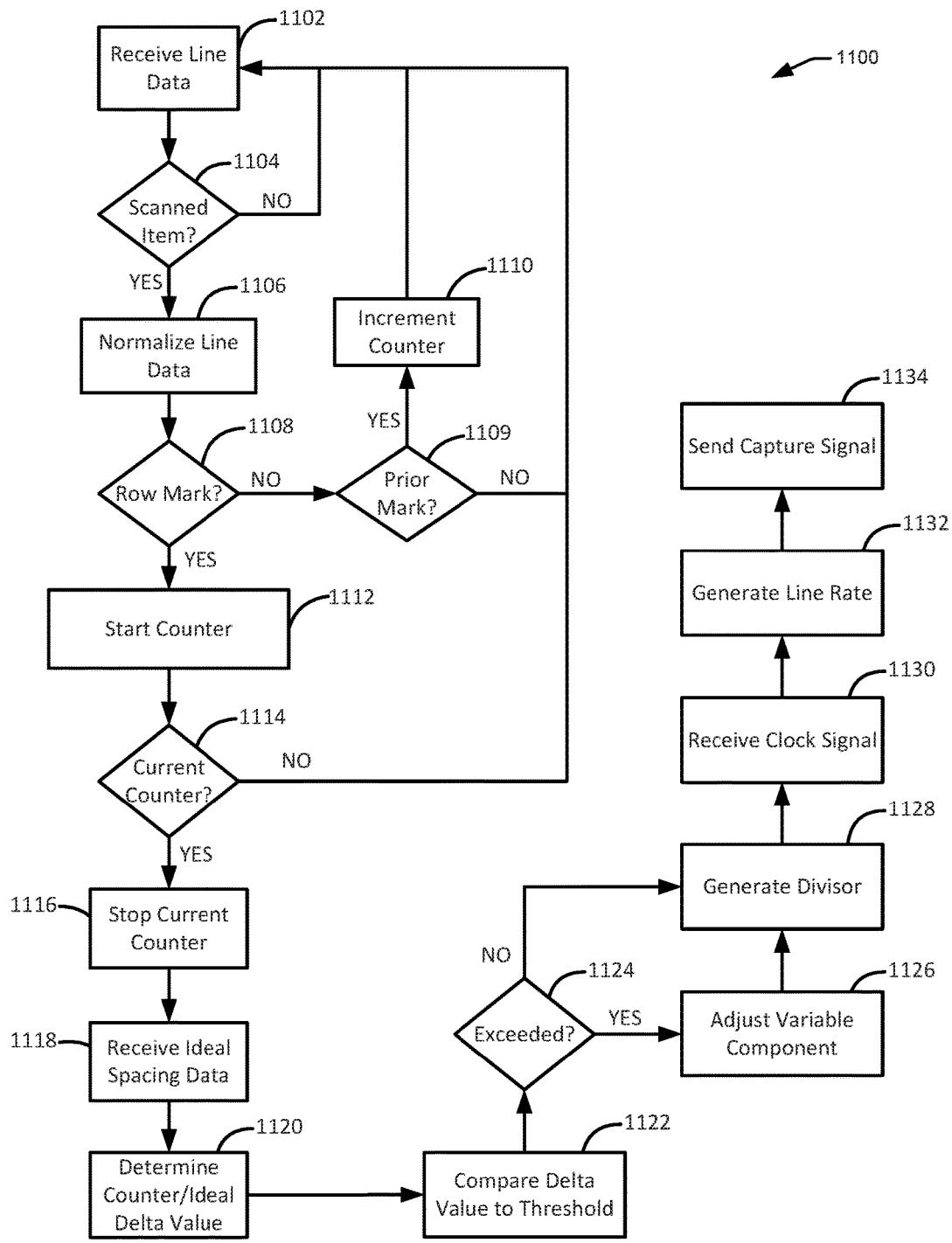
FIG. 11 is a flowchart illustrating one embodiment of a process for imager exposure rate control.

With reference now to FIG. 11, a flowchart illustrating one embodiment of a process 1100 for imager exposure rate control is shown. In some embodiments, the process 1100 can provide dynamic control of imager exposure rate to compensate for variability in feed rate of the feed device 706. In some embodiments, this can decrease maintenance requirements of the feed device 706 and can allow the feed device 706 to operate at higher speeds, thereby increasing throughput through the scanner 124.

The process 1100 can be performed by the scanner 124, and specifically by the camera 702, the control unit 704, and the feed device 706 of the scanner 124. The process 1100 begins at block 1102 wherein line data is received. In some embodiments, the line data is received from the camera 702 by the control unit 704.

After the line data has been received, the process 1100 proceeds to block 1104 wherein it is determined if the line data is generated from a scanned item 800. In some embodiments, for example, the camera 702 may generate line data of the imaging area in response to the received command from the control unit 704 regardless of whether the scanned item 800 is in the imaging area. Thus, in some embodiments, the line data may be captured from the scanned item 800 or may not be captured from the scanned item 800. In some embodiments, the determination of whether the line data is captured from the scanned item 800 can be determined by evaluating one or several pixel properties such as, for example one or several pixel values of the pixels forming the line data in some embodiments, for example the imaging area may have a different color than the scanned item 800 such that pixel values of pixels generated from the imaging area are different then pixel values of pixels generated from the scanned item 800. In such embodiments, the presence or absence of the scanned item 800 in the imaging area can be determined by comparing pixel values from the received line data to pixel values for the imaging area without the scanned item 800 and/or pixel values for the imaging area with the scanned item 800.

If it is determined that the received line data is not generated from the scanned item 800, then the process 1100 returns to block 1102 and proceeds as outlined above. If it is determined that the received line data is generated from the scanned item 800, then the process 1100 proceeds to block 1106 wherein the received line data is normalized. In some embodiments, the normalization of the line data can include the processing of the received line data to standardize line data. In some embodiments, for example, this can include the adjusting of one or several pixel values associated with some or all of the pixels of the line data. In some embodiments, for example, this can include adjusting pixel values to standardize or achieve a desired pixel color, brightness, contrast, or the like. This normalization can be performed by the control unit 704.

After the line data has been normalized, the process 1100 proceeds to decision state 1108 wherein it is determined if a row mark is identified in the line data. In some embodiments, the identification of the row mark can be performed as outlined above in processes 900, 1000. If a row mark is not identified, then the process 1100 proceeds to decision state 1109, wherein it is determined if a prior row mark was identified. In some embodiments, for example, a value indicative of the identification of a row mark can be stored in memory associated with the control unit and/or one of the databases 104 such as the scan database 312. In such embodiments, the existence of a prior row mark can be determined by determining the presence of the value indicative of the identified row mark in the memory associated with the control unit 704.

If it is determined that there was no prior row mark, then the process 1100 returns to block 1102 and proceeds as outlined above. If it is determined that there was a prior identified row mark, then the process 1100 proceeds to block 1110, wherein a counter is incremented. In some embodiments, this counter can be started by the identification of a previous row mark and can be incremented each time a set of line data is received until another row mark is identified. After the counter has been incremented, the process 1100 can return to block 1102 and can proceed as outlined above.

Returning again to decision state 1108, if is determined that the received line data contains a row mark, then the process 1100 proceeds to block 1112, wherein a counter is started. In some embodiments, this counter can track the number of lines of pixels or the number of sets of line data between adjacent row marks. Specifically, this counter can be started when a row mark is identified, and can be incremented for each subsequent received set of line data until a set of line data is received in which a new row mark is identified. Once the set of line data has been received in which a new row mark has been identified, the counter can be stopped.

After the counter has been started, the process 1100 proceeds to decision state 1114, wherein it is determined if there is a current counter. In some embodiments, the current counter can be a counter started with the identification of a previous row mark and that has not yet terminated by the finding of a subsequent row mark. In some embodiments, the determination of a current counter can include determining whether a previous row mark associated with the scanned item 800 has been identified. If a current counter is not identified, then the process 1100 returns to block 1102, and proceeds as outlined above.

If a current counter is identified, then the process 1100 proceeds to block 1116, wherein the current counter is stopped. After the current counter is stopped, the process 1100 proceeds to block 1118 wherein ideal spacing data is received. In some embodiments, the ideal spacing data can identify a desired number of sets of line data between consecutive row marks. In some embodiments, the ideal spacing data can be unique to the scanned item 800 and in some embodiments, the ideal spacing data can be applicable to a plurality of scanned items 800. In some embodiments, the ideal spacing data can be received and/or retrieved from the scan database 312 and/or from memory associated with the control unit 704.

After the ideal spacing data has been received, the process 1100 proceeds to block 1120 wherein the delta value characterizing the difference between the current counter value and the ideal spacing data is generated. In some embodiments, this delta value can be generated by determining the difference between the current counter value and the ideal spacing data. In some embodiments, the delta value can be positive when the counter value is greater than the ideal spacing data and the delta value can be negative when the counter value is less than the ideal spacing data. In some embodiments, the delta value indicates the number of lines of pixels between consecutive row marks that exceed the ideal spacing data or that are less than the ideal spacing data. The delta value can be stored in memory associated with the control unit 704 and/or in one of the databases 104 such as the scan database 312.

After the delta value has been determined, the process 1100 proceeds to block 1122 when the delta value is compared to a threshold value. In some embodiments, the threshold value can delineate between satisfactory delta values and unsatisfactory delta values, and more specifically can delineate between instances in which to many lines of pixels are generated between row marks and the desired number of lines of pixels are generated between row marks and/or instances in which to few lines of pixels are generated between row marks and the desired number of pixels are generated between row marks. In some embodiments, the threshold value can comprise a first threshold delineating between too few lines of pixels between row marks and a satisfactory number of lines of pixels between row marks, and a second threshold delineating between too many lines of pixels between row marks and a satisfactory number of lines of pixels between row marks. The threshold value can be received and/or retrieved from the threshold database 311 and can be compared to the delta value by the control unit 704. In some embodiments, a first value can be associated with the delta value if the comparison of the delta value to threshold indicates that too few lines of pixels were generated between row marks, a second value can be associated with the delta value if the comparison of the delta value to the threshold indicates that too many lines of pixels were generated between row marks, and the third value can be associated with the delta value if the comparison of the delta value to the threshold indicates a satisfactory number of lines of pixels were generated between row marks.

After the delta value has been compared to the threshold, the process 1100 proceeds to decision state 1124 wherein it is determined if the threshold is exceeded in that there are either too few or too many lines of pixels between row marks. In some embodiments, this can include determining whether the first, second, or third value was associated with the delta value. If one of the first or second values is associated with the delta value, then the threshold is exceeded in the process 1100 proceeds to block 1126 wherein a variable component is adjusted. In some embodiments, the variable component can be increased when too many sets of line data or too many lines of pixels were captured between consecutive row marks, and in some embodiments, the variable component can be decreased when too few sets of line data or too few lines of pixels were captured between consecutive row marks. In some embodiments, the degree to which variable component is changed can vary based on the degree to which too many, or too few sets of line data or lines of pixels were captured between consecutive row marks.

After the variable component has been adjusted, or returning again to decision state 1124, if the threshold is not exceeded, the process 1100 proceeds to block 1128, wherein the divisor is generated. In some embodiments, the divisor can be generated by adding the variable component to any other components forming the divisor. These other components can include, for example, a fixed component set by a user of the scanner 124.

After the divisor has been generated, the process 1100 proceeds to block 1130, wherein the clock signal is received. In some embodiments, the clock signal comprises a plurality of signals establishing a clock frequency. The clock signal can be received from the clock by other components of the control unit 704, and particularly can be received by the divider.

After the clock signal has been received, the process 1100 proceeds to block 1132, wherein the line rate is generated. In some embodiments, the line rate can be generated by dividing the clock frequency by the divisor with the divider circuit. After the line rate has been generated, the process 1100 proceeds to block 1134, wherein the capture signal is generated and/or sent. The capture signal can be generated by the control unit 704 and can be based on the line rate. The capture signal can be sent by the control unit 704 to the camera 702.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system for compensating for growth in a scanned item, wherein the scanned item comprises a plurality of row marks comprising a first group of row marks and a second group of row marks, wherein the row marks are regularly spaced along at least part of a length of the scanned item, the system comprising:
   a scanner comprising:
      a line scan camera configured to generate a plurality of sets of line data each comprising a line of pixels of a portion of the scanned item in an imaging area;
      a control unit communicatingly connected to the line scan camera; and
      a feed device coupled to the line scan camera and configured to move at least a portion of the scanned item through the imaging area;
      wherein the control unit is configured to:
         identify one of a first group of row marks, wherein the first group of row marks is located along a first side of the scanned item;
         identify one of a second group of row marks, wherein the second group of row marks is located along a second side of the scanned item;
         generate for the sets of line data corrected response area positions based on the identified one of the first group of row marks and the identified one of the second group of row marks; and
         send the sets of line data and the corrected response area positions to a content management server communicatingly linked to the scanner; and
   the content management server communicatingly linked to the scanner, wherein the content management server is configured to: sequentially receive lines of pixels from the line scan camera; and generate image data with the received lines of pixels.

2. The system of claim 1, wherein the control unit is configured to determine distance between the identified one of the first group of row marks and the identified one of the second group of row marks.

3. The system of claim 2, wherein the distance between the identified one of the first group of row marks and the identified one of the second group of row marks comprises a number of pixels between the identified one of the first group of row marks and the identified one of the second group of row marks.

4. The system of claim 3, wherein the control unit is configured to:
   retrieve a standard count value, wherein the standard count value defines an expected distance between the identified one of the first group of row marks and the identified one of the second group of row marks; and
   compare the number of pixels between the identified one of the first group of row marks and the identified one of the second group of row marks to the standard count value.

5. The system of claim 4, wherein the control unit is configured to generate an error value based on the comparison of the number of pixels between the identified one of the first group of row marks and the identified one of the second group of row marks to the standard count value.

6. The system of claim 5, wherein generating a corrected response area positions comprises:
   retrieving standard response area positions; and
   applying the error value to the standard response area positions.

7. The system of claim 6, wherein the control unit is configured to identify at least one response in at least one of the corrected response area positions.

8. The system of claim 1, wherein the image data comprises a combination of multiple lines of pixels into a single image.

9. The system of claim 8, further comprising a scan database configured to: receive the image data from the server; and store the received image data.

10. The system of claim 9, wherein identifying one of the first group of row marks comprises identifying a first contiguous group of pixels in at least two consecutive lines of pixels, wherein the first contiguous group of pixels: is located in a specified first portion of the pixels in each of the at least two consecutive lines of pixels; and includes a specified number of pixels in each of the at least two consecutive lines of pixels.

11. The system of claim 10, wherein identifying one of the second group of row marks comprises identifying a second contiguous group of pixels in at least two consecutive lines of pixels, wherein the second contiguous group of pixels: is located in a specified second portion of the pixels in each of the at least two consecutive lines of pixels; and includes a specified number of pixels in each of the at least two consecutive lines of pixels.

12. The system of claim 1, wherein the control unit is configured to:

receive a first set of line data from the line scan camera, wherein the one of the first group of row marks is identified in the first set of line data;
update a buffer to include the first set of line data;
receive subsequent sets of line data from the line scan camera;
determine that one of a second group of row marks is not found in the subsequent sets of line data;
update the buffer to include the subsequent sets of line data;
receive a third set of line data from the line scan camera, wherein the one of the second group of row marks is identified in the third set of line data;
determine excess skew based on the number of sets of line data between the first set of line data and the third set of line data; and
generate skewless data from the line data contained in the buffer.

13. A method for compensating for growth in a scanned item, wherein the scanned item comprises a plurality of row marks comprising a first group of row marks and a second group of row marks, wherein the row marks are regularly spaced along at least part of a length of the scanned item, the method comprising:
controlling a feed device of a scanner to move at least a portion of the scanned item through an imaging area of a line scan camera, wherein the feed device is coupled to the line scan camera;
controlling the line scan camera of the scanner to repeatedly generate a set of line data of the portion of the scanned item in the imaging area, wherein the set of line data comprises a line of pixels, and wherein the portion of the scanned item from which the set of line data is generated changes with movement of the portion of the scanned item through the imaging area;
identifying one of a first group of row marks with a control unit of the scanner, wherein the first group of row marks is located along a first side of the scanned item;
identifying one of a second group of row marks with the control unit, wherein the second group of row marks is located along a second side of the scanned item;
generating for the set of line data corrected response area positions based on the identified one of the first group of row marks and the identified one of the second group of row marks with the control unit of the scanner; and
sending the set of line data and the corrected response area positions to a content management server communicatingly linked to the control unit, wherein the content management server is configured to: receive lines of pixels from the line scan camera; and generate image data with the received lines of pixels.

14. The method of claim 13, further comprising determining a distance between the identified one of the first group of row marks and the identified one of the second group of row marks with the control unit.

15. The method of claim 14, wherein the distance between the identified one of the first group of row marks and the identified one of the second group of row marks comprises a number of pixels between the identified one of the first group of row marks and the identified one of the second group of row marks.

16. The method of claim 15, further comprising:
retrieving a standard count value, wherein the standard count value defines an expected distance between the identified one of the first group of row marks and the identified one of the second group of row marks; and
comparing the number of pixels between the identified one of the first group of row marks and the identified one of the second group of row marks to the standard count value.

17. The method of claim 16, further comprising generating an error value based on the comparison of the number of pixels between the identified one of the first group of row marks and the identified one of the second group of row marks to the standard count value.

18. The method of claim 17, wherein generating a corrected response area positions comprises:
retrieving standard response area positions; and
applying the error value to the standard response area positions.

19. The method of claim 18, further comprising identifying at least one response in at least one of the corrected response area positions.

20. The method of claim 19, wherein identifying one of the first group of row marks comprises identifying a first contiguous group of pixels in at least two consecutive lines of pixels, wherein the first contiguous group of pixels: is located in a specified first portion of the pixels in each of the at least two consecutive lines of pixels; and includes a specified number of pixels in each of the at least two consecutive lines of pixels.

* * * * *